United States Patent
Zhang

(10) Patent No.: US 11,082,739 B2
(45) Date of Patent: Aug. 3, 2021

(54) DATA FLOW CONTROL METHOD AND APPARATUS

(71) Applicant: Huawei Technologies Co., Ltd., Shenzhen (CN)

(72) Inventor: Bo Zhang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/585,889

(22) Filed: Sep. 27, 2019

(65) Prior Publication Data

US 2020/0029121 A1 Jan. 23, 2020

Related U.S. Application Data

(63) Continuation of application No. PCT/CN2017/117513, filed on Dec. 20, 2017.

(30) Foreign Application Priority Data

Mar. 29, 2017 (CN) .......................... 201710197328.0

(51) Int. Cl.
*H04N 21/4363* (2011.01)
*H04N 21/44* (2011.01)
(Continued)

(52) U.S. Cl.
CPC ......... *H04N 21/43635* (2013.01); *G06F 5/06* (2013.01); *G06F 5/14* (2013.01); *H04N 21/4385* (2013.01); *H04N 21/44004* (2013.01)

(58) Field of Classification Search
None
See application file for complete search history.

(56) References Cited

U.S. PATENT DOCUMENTS 6,914,637 B1 * 7/2005 Wolf ................. H04N 21/2383
348/473
7,088,398 B1 * 8/2006 Wolf ................. H04N 21/2383
348/423.1
(Continued)

FOREIGN PATENT DOCUMENTS

CN 1625899 A 6/2005
CN 101212671 A 7/2008
(Continued)

OTHER PUBLICATIONS

'HDMI Transmitter' by Bjarte Loken Nystoyl, Jun. 2012. (Year: 2012).*
(Continued)

*Primary Examiner* — Steven G Snyder
(74) *Attorney, Agent, or Firm* — Slater Matsil, LLP

(57) ABSTRACT

This application discloses a data flow control method and apparatus. The method includes: calculating, by a device when a clock signal arrives, a quantity of transition-minimized differential signaling (TMDS) characters currently stored in a buffer of the device; and outputting, by the device, the TMDS character in the buffer when the quantity of TMDS characters currently stored in the buffer reaches a preset value, or outputting a gap data packet when the quantity of TMDS characters currently stored in the buffer does not reach a preset value, where the preset value is less than or equal to a TMDS character storage capacity of the buffer.

21 Claims, 12 Drawing Sheets

(51) Int. Cl.
*H04N 21/4385* (2011.01)
*G06F 5/06* (2006.01)
*G06F 5/14* (2006.01)

(56) References Cited

U.S. PATENT DOCUMENTS

| | | |
|---|---|---|
| 10,812,751 B2 * | 10/2020 | Stern .................. H04N 5/60 |
| 2003/0142240 A1 | 7/2003 | Masters |
| 2004/0049592 A1 | 3/2004 | Yurusov |
| 2011/0249192 A1 | 10/2011 | Shamarao |
| 2014/0218616 A1 | 8/2014 | Toba et al. |
| 2020/0092515 A1 * | 3/2020 | Stern ............... H04N 21/43635 |

FOREIGN PATENT DOCUMENTS

| | | | |
|---|---|---|---|
| CN | 101521807 A | 9/2009 | |
| CN | 103814577 A | 5/2014 | |
| CN | 105227955 A | 1/2016 | |
| EP | 1736867 A2 | 12/2006 | |
| WO | WO-03058376 A2 * | 7/2003 | ............. H04L 25/49 |
| WO | WO-03058826 A2 * | 7/2003 | ............. H04L 1/203 |
| WO | WO-03058946 A2 * | 7/2003 | ......... H04N 21/4341 |

OTHER PUBLICATIONS

'High-Definition Multimedia Interface Specification' Version 1.3a, pp. 1-2, Nov. 10, 2006 (full document found at hdmi.org). (Year: 2006).*

'A New Horizon for HDMI 2.1—8K (Concepts and Specifications)' by Allion Labs Tina Yu, copyright 2018. (Year: 2018).*

* cited by examiner

|  | First FRL character | Second FRL character | Third FRL character | Fourth FRL character |  |
|---|---|---|---|---|---|
| 6 most significant bits | Type | TMDS character 1 | TMDS character 3 | TMDS character 5 | ⋮ |
| 10 least significant bits | Length L | TMDS character 0 | TMDS character 2 | TMDS character 4 | |

FIG. 1

DATA FLOW CONTROL METHOD AND APPARATUS

CROSS-REFERENCE TO RELATED APPLICATIONS

This application is a continuation of International Application No. PCT/CN2017/117,513, filed on Dec. 20, 2017, which claims priority to Chinese Patent Application No. 201710197328.0, filed on Mar. 29, 2017. The disclosures of the aforementioned applications are hereby incorporated by reference in their entireties.

TECHNICAL FIELD

This application relates to the field of communications technologies, and in particular, to a data flow control method and apparatus.

BACKGROUND

A high definition multimedia interface (HDMI) is a digital video/audio interface technology, and is a dedicated digital interface that is suitable for image transmission. The high definition multimedia interface may simultaneously transfer audio and image signals. In the existing HDMI standard protocol version 2.0, the high definition multimedia interface converts video display data, a display control signal, audio data, and the like into transition-minimized differential signaling (TMDS) characters for transmission in an HDMI cable.

Currently, compared with the original version 2.0, a fixed rate link (FRL) transmission mode is newly added to the HDMI standard version 2.1, and is used to support a higher display data transmission rate in the version 2.1 than that in the version 2.0, to support transmission using a video standard with higher resolution and a higher frame rate. In most application scenarios, a TMDS character input rate in the FRL transmission mode is less than a TMDS character transmission rate required on the link. In addition, in the HDMI standard version 2.1, a data packet named gap (GAP) is proposed. The data packet is mainly used to perform TMDS character matching in the FRL transmission mode. In the current technology, to perform TMDS character rate matching, a related technical person provides the following solution. A buffer is disposed in the FRL transmission mode, where the buffer may be used to store a TMDS character that is input to the FRL; and based on a clock cycle of the FRL link, the TMDS character in the buffer or the gap data packet is output to the FRL link for transmission.

However, in the HDMI standard version 2.1, there is no related specification for TMDS character output and gap data packet output. In actual application, a preset storage capacity of the buffer on the FRL is limited. As a result, if gap data packets are continuously output when a clock signal of the FRL arrives, because TMDS characters are continuously input to the buffer on the FRL, overflow may occur in the buffer. The overflow means that a quantity of input TMDS characters exceeds the storage capacity of the buffer. If TMDS characters in the buffer are continuously output to an FRL transmission channel when a clock signal arrives, because the TMDS character input rate on the FRL is less than the TMDS character transmission rate required on the FRL, underflow may occur in the buffer. The underflow means that there is still a requirement for TMDS character output from the buffer when the entire buffer has no TMDS character. Both the overflow and the underflow in the buffer may destroy an original TMDS character inherent display time sequence.

SUMMARY

This application provides a data flow control method and apparatus, so that neither overflow nor underflow occurs in a buffer in an FRL, and a TMDS character inherent display time sequence.

According to a first aspect, this application provides a data flow control method, including: calculating, by a device when a clock signal arrives, a quantity of transition-minimized differential signaling (TMDS) characters currently stored in a buffer of the device, where a cycle of the clock signal is set based on a TMDS character transmission rate on a fixed rate link FRL; and outputting, by the device, a TMDS character in the buffer when the quantity of TMDS characters currently stored in the buffer reaches a preset value, or outputting a gap data packet when the quantity of TMDS characters currently stored in the buffer does not reach a preset value, where the preset value is less than or equal to a TMDS character storage capacity of the buffer.

It can be learned that, according to the data flow control method, it can be ensured that neither overflow nor underflow occurs in the buffer, so that a TMDS character inherent display time sequence is maintained.

With reference to the first aspect, in a first possible implementation, the calculating, by a device when a clock signal arrives, a quantity of TMDS characters currently stored in a buffer of the device includes: when the clock signal arrives, obtaining, by the device, a first total quantity of TMDS characters currently input to the buffer and a second total quantity of TMDS characters currently output from the buffer; and using, by the device, a difference between the first total quantity and the second total quantity as the quantity of TMDS characters currently stored in the buffer.

With reference to the first aspect or the first possible implementation, in a second possible implementation, the outputting, by the device, a TMDS character in the buffer when the quantity of TMDS characters currently stored in the buffer reaches a preset value includes: when the quantity of TMDS characters currently stored in the buffer reaches the preset value, outputting, by the device, one TMDS character stored in the buffer.

It can be learned that, in this possible implementation, the buffer can theoretically store only one TMDS character. In this case, in specific implementation, a very small capacity may be designed for the buffer, and this imposes a relatively low requirement on the buffer, and is easy to implement.

With reference to the first aspect or the first possible implementation, in a third possible implementation, the clock signal is a first clock signal; and the outputting, by the device, a TMDS character in the buffer when the quantity of TMDS characters currently stored in the buffer reaches a preset value includes: when the quantity of TMDS characters currently stored in the buffer reaches the preset value, outputting, by the device, one TMDS character stored in the buffer; and when a second clock signal to an $I^{th}$ clock signal that are subsequent to the first clock signal, each arrive, outputting, by the device, one TMDS character stored in the buffer, where I is greater than or equal to 2 and is less than or equal to M, M is the quantity of TMDS characters currently stored in the buffer, and both I and M are integers.

It can be learned that, in this possible implementation, a determining process is executed once only when at least two TMDS characters are output, so that power consumption of the device can be reduced.

With reference to the first aspect, in a fourth possible implementation, the calculating, by a device when a clock signal arrives, a quantity of TMDS characters currently stored in a buffer of the device includes: when the clock signal arrives, obtaining, by the device, a third total quantity of TMDS characters input to the buffer and a fourth total quantity of TMDS characters input to the buffer, where the third total quantity is a total quantity of TMDS characters input to the buffer until the buffer outputs the last stored TMDS character previous time, and the fourth total quantity is a total quantity of TMDS characters input to the buffer at a current moment; and using, by the device, a difference between the fourth total quantity and the third total quantity as the quantity of TMDS characters currently stored in the buffer.

With reference to the fourth possible implementation, in a fifth possible implementation, the clock signal is a first clock signal, the quantity of TMDS characters currently stored in the buffer is M, and M is an integer; and the outputting, by the device, a TMDS character in the buffer when the quantity of TMDS characters currently stored in the buffer reaches a preset value includes: when M reaches the preset value, outputting, by the device, one TMDS character stored in the buffer; and when a second clock signal to an $M^{th}$ clock signal that are subsequent to the first clock signal, each arrive, outputting, by the device, one TMDS character stored in the buffer.

It can be learned that, a determining process is executed once only when all TMDS characters in the buffer are output, so that power consumption of the device can be reduced.

According to a second aspect, a data flow control apparatus is provided, including: a buffer unit, configured to store a transition-minimized differential signaling (TMDS) character; a calculation unit, configured to: when a clock signal arrives, calculate a quantity of TMDS characters currently stored in the buffer unit, where a cycle of the clock signal is set based on a TMDS character transmission rate on a fixed rate link FRL; and an output unit, configured to: output a TMDS character in the buffer unit when the quantity of TMDS characters currently stored in the buffer unit reaches a preset value, or output a gap data packet when the quantity of TMDS characters currently stored in the buffer unit does not reach a preset value, where the preset value is less than or equal to a TMDS character storage capacity of the buffer unit.

With reference to the second aspect, in a first possible implementation, the calculation unit is specifically configured to: when the clock signal arrives, obtain a first total quantity of TMDS characters currently input to the buffer unit and a second total quantity of TMDS characters currently output from the buffer unit; and use a difference between the first total quantity and the second total quantity as the quantity of TMDS characters currently stored in the buffer unit.

With reference to the second aspect or the first possible implementation, in a second possible implementation, the output unit is specifically configured to: when the quantity of TMDS characters currently stored in the buffer unit reaches the preset value, output one TMDS character stored in the buffer unit.

With reference to the second aspect or the first possible implementation, in a second possible implementation, the clock signal is a first clock signal; and the output unit is specifically configured to: when the quantity of TMDS characters currently stored in the buffer unit reaches the preset value, output one TMDS character stored in the buffer unit; and when a second clock signal to an $I^{th}$ clock signal that are subsequent to the first clock signal, each arrive, output one TMDS character stored in the buffer unit, where I is greater than or equal to 2 and is less than or equal to M, M is the quantity of TMDS characters currently stored in the buffer unit, and both I and M are integers.

With reference to the second aspect, in a third possible implementation, the calculation unit is specifically configured to: when the clock signal arrives, obtain a third total quantity of TMDS characters input to the buffer unit and a fourth total quantity of TMDS characters input to the buffer unit, where the third total quantity is a total quantity of TMDS characters input to the buffer unit until the buffer unit outputs the last stored TMDS character previous time, and the fourth total quantity is a total quantity of TMDS characters input to the buffer unit at a current moment; and use a difference between the fourth total quantity and the third total quantity as the quantity of TMDS characters currently stored in the buffer unit.

With reference to the third possible implementation, in a fourth possible implementation, the clock signal is a first clock signal, the quantity of TMDS characters currently stored in the buffer unit is M, and M is an integer; and the output unit is specifically configured to: when M reaches the preset value, output one TMDS character stored in the buffer unit; and when a second clock signal to an $M^{th}$ clock signal that are subsequent to the first clock signal, each arrive, output one TMDS character stored in the buffer unit.

Mutual reference may be made to implementation and beneficial effects of the apparatus in the second aspect or any implementation of the second aspect in this application and implementation and beneficial effects of the method in the first aspect or any implementation of the first aspect in the present invention. No repeated description is provided.

According to a third aspect, this application provides a data flow control device, including a processor, a memory, and a communications interface, where the processor, the memory, and the communications interface are all connected by using a bus; the memory is configured to store a computer execution instruction; and the processor is configured to execute the computer execution instruction stored in the memory, to perform the following operations: calculating, when a clock signal arrives, a quantity of transition-minimized differential signaling (TMDS) characters currently stored in a buffer of the device; and outputting a TMDS character in the buffer when the quantity of TMDS characters currently stored in the buffer reaches a preset value, or outputting a gap data packet when the quantity of TMDS characters currently stored in the buffer does not reach a preset value, where the preset value is less than or equal to a TMDS character storage capacity of the buffer.

With reference to the third aspect, in a first possible implementation, that the processor calculates, when a clock signal arrives, a quantity of TMDS characters currently stored in a buffer of the device includes: when the clock signal arrives, obtaining a first total quantity of TMDS characters currently input to the buffer and a second total quantity of TMDS characters currently output from the buffer; and using a difference between the first total quantity and the second total quantity as the quantity of TMDS characters currently stored in the buffer.

With reference to the third aspect or the first possible implementation, in a second possible implementation, to output a TMDS character in the buffer when the quantity of TMDS characters currently stored in the buffer reaches the preset value, the processor is specifically configured to: when the quantity of TMDS characters currently stored in the buffer reaches the preset value, output one TMDS character stored in the buffer.

With reference to the third aspect or the first possible implementation, in a third possible implementation, that the processor outputs a TMDS character in the buffer when the quantity of TMDS characters currently stored in the buffer reaches a preset value includes: when the quantity of TMDS characters currently stored in the buffer reaches the preset value, outputting one TMDS character stored in the buffer.

With reference to the third aspect, in a fourth possible implementation, that the processor calculates, when a clock signal arrives, a quantity of TMDS characters currently stored in a buffer of the device includes: when the clock signal arrives, obtaining a third total quantity of TMDS characters input to the buffer and a fourth total quantity of TMDS characters input to the buffer, where the third total quantity is a total quantity of TMDS characters input to the buffer until the buffer outputs the last stored TMDS character previous time, and the fourth total quantity is a total quantity of TMDS characters input to the buffer at a current moment; and using a difference between the fourth total quantity and the third total quantity as the quantity of TMDS characters currently stored in the buffer.

With reference to the fourth possible implementation, in a fifth possible implementation, the clock signal is a first clock signal; and to output a TMDS character in the buffer when the quantity of TMDS characters currently stored in the buffer reaches the preset value, the processor is specifically configured to: when the quantity of TMDS characters currently stored in the buffer reaches the preset value, output one TMDS character stored in the buffer; and when a second clock signal to an $I^{th}$ clock signal that are subsequent to the first clock signal, each arrive, output one TMDS character stored in the buffer, where I is greater than or equal to 2 and is less than or equal to M, M is the quantity of TMDS characters currently stored in the buffer, and both I and M are integers.

Mutual reference may be made to implementation and beneficial effects of the apparatus in any one of the third aspect or the implementations of the third aspect in this application and implementation and beneficial effects of the method in any one of the first aspect or the implementations of the first aspect in this application. No repeated description is provided.

According to a fourth aspect, this application further provides a data flow control device, including a buffer, a TMDS character counter, a controller, a multiplexer, and a gap data packet generator, where the buffer is configured to store a transition-minimized differential signaling (TMDS) character; the TMDS character counter is configured to: record a quantity of TMDS characters input to and/or output from the buffer, and send the recorded quantity of TMDS characters to the controller; the controller is configured to: when a clock signal arrives, calculate, based on the quantity of TMDS characters that is recorded by the TMDS character counter, a quantity of TMDS characters currently stored in the buffer, and send a first control signal to the multiplexer when the quantity of TMDS characters currently stored in the buffer reaches a preset value, or send a second control signal to the multiplexer when the quantity of TMDS characters currently stored in the buffer does not reach a preset value, where a cycle of the clock signal is set based on a TMDS character transmission rate on a fixed rate link FRL; and the multiplexer is configured to: when receiving the first control signal from the controller, output a TMDS character in the buffer, or when receiving the second control signal from the controller, output a gap data packet generated by the gap data packet generator.

With reference to the fourth aspect, in a first possible implementation, the TMDS character counter includes an input TMDS character counter and an output TMDS character counter; and to calculate, when the clock signal arrives, the quantity of TMDS characters currently stored in the buffer, the controller is specifically configured to: when the clock signal arrives, obtain, by the controller, a first count value currently recorded by the input TMDS character counter and a second count value recorded by the output TMDS character counter, where the first count value is used to indicate a quantity that is of TMDS characters input to the buffer and that is currently recorded by the input TMDS character counter, and the second count value is used to indicate a quantity that is of TMDS characters output from the buffer and that is currently recorded by the output TMDS character counter; and use, by the controller, a difference between the first count value and the second count value as the quantity of TMDS characters currently stored in the buffer.

With reference to the fourth aspect or the first possible implementation, in a second possible implementation, to output a TMDS character in the buffer when receiving the first control signal from the controller, the multiplexer is specifically configured to: output, by the multiplexer, one TMDS character in the buffer when receiving the first control signal from the controller.

With reference to the fourth aspect, the first possible implementation, or the second possible implementation, in a third possible implementation, the clock signal is a first clock signal; and that the controller sends a first control signal to the multiplexer when the quantity of TMDS characters currently stored in the buffer reaches a preset value includes: sending, by the controller, the first control signal to the multiplexer when the quantity of TMDS characters currently stored in the buffer reaches the preset value; and sending, by the controller, the first control signal to the multiplexer when a second clock signal to an $I^{th}$ clock signal that are subsequent to the first clock signal, each arrive, where I is greater than or equal to 2 and is less than or equal to M, and M is the quantity of TMDS characters currently stored in the buffer.

With reference to the fourth aspect, in a fourth possible implementation, the TMDS character counter includes an input TMDS character counter; and to calculate, when the clock signal arrives, the quantity of TMDS characters currently stored in the buffer, the controller is specifically configured to: when the clock signal arrives, obtain, by the controller, a third count value and a fourth count value that are recorded by the input TMDS character counter, where the third count value is used to indicate a quantity that is of TMDS characters input to the buffer and that is recorded by the input TMDS character counter until the buffer outputs the last stored TMDS character previous time, and the fourth count value is used to indicate a quantity that is of TMDS characters input to the buffer and that is currently recorded by the input TMDS character counter; and use, by the controller, a difference between the fourth count value and the third count value as the quantity of TMDS characters currently stored in the buffer.

With reference to the fourth possible implementation, in a fifth possible implementation, the clock signal is a first clock signal, the quantity of TMDS characters currently stored in the buffer is M, and M is an integer; and that the controller sends a first control signal to the multiplexer when the quantity of TMDS characters currently stored in the buffer reaches a preset value includes: sending, by the controller, the first control signal to the multiplexer when the quantity of TMDS characters currently stored in the buffer reaches the preset value; and sending, by the controller, the first control signal to the multiplexer when a second clock signal to an $M^{th}$ clock signal that are subsequent to the first clock signal, each arrive.

Mutual reference may be made to implementation and beneficial effects of the apparatus in any one of the fourth aspect or the implementations of the fourth aspect in this application and implementation and beneficial effects of the method in any one of the first aspect or the implementations of the first aspect in the present invention. No repeated description is provided.

According to a fifth aspect, this application further provides a readable storage medium, configured to store a software instruction used to execute the function in any one of the first aspect or the implementations of the first aspect of the present invention. The readable storage medium includes a program designed to perform the method in any one of the first aspect or the implementations of the first aspect of the present invention.

It can be learned from the foregoing descriptions that, in this application, when a clock signal arrives, a terminal calculates the quantity of TMDS characters stored in the buffer. When the quantity of stored TMDS characters reaches the preset value, it indicates that the storage capacity of the buffer is to be full, and a TMDS character is output from the buffer. When the quantity of stored TMDS characters does not reach the preset value, the gap data packet is output. According to the foregoing method, it can be ensured that neither overflow nor underflow occurs in the buffer, so that the TMDS character inherent display time sequence is maintained.

BRIEF DESCRIPTION OF THE DRAWINGS

FIG. 1 is a schematic diagram of an FRL data packet according to this application;

DETAILED DESCRIPTION OF ILLUSTRATIVE EMBODIMENTS

Figure 2:
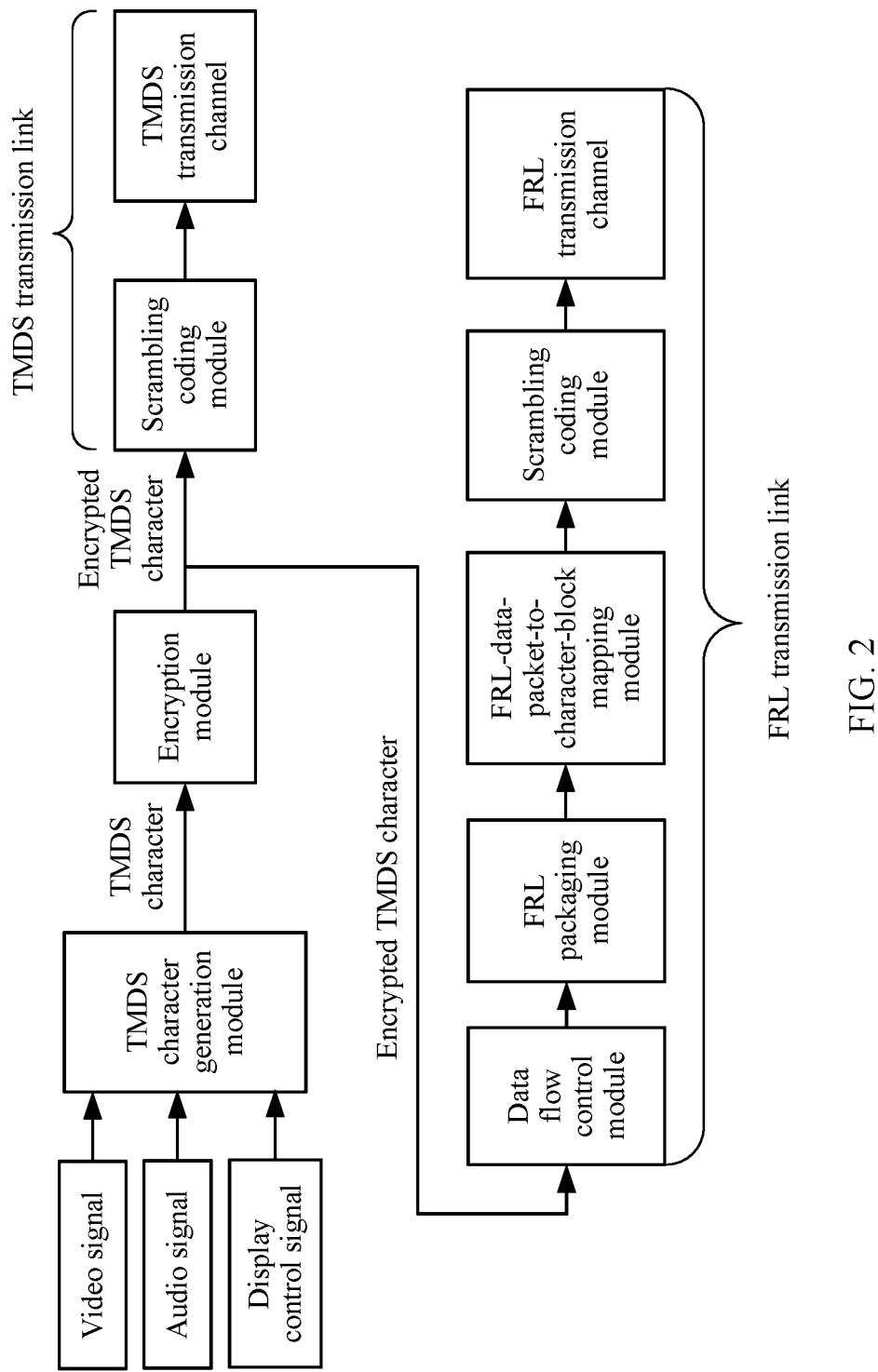
FIG. 2 is a schematic diagram of a transmission mode provided in the HDMI standard protocol version 2.1 according to this application.

For ease of understanding, some technical terms in this application are first explained, and details are as follows.

A high definition multimedia interface (HDMI) is a digital video/audio interface technology, and is a dedicated digital interface that is suitable for image transmission. The high definition multimedia interface may simultaneously transfer audio and image signals, and may be used to transmit a video/audio signal between various terminals, for example, transmit a video/audio signal between a set-top box and a television, and transmit a video/audio signal between a television and a computer.

Transition-minimized differential signaling (TMDS) is a video and audio data transmission format specified in the HDMI standard protocol version 2.0, and mainly falls into two types: a blanking area video data type and an effective video data type. In the HDMI standard protocol version 2.0, input video display data, an input display control signal, input audio data, and the like are converted into data in a TMDS format for transmission in an HDMI cable.

A fixed rate link (FRL) is proposed in the HDMI standard protocol version 2.1 to support transmission at a higher rate than that in the version 2.0.

An FRL data packet is a data packet transmitted on an FRL transmission channel. A format of the FRL data packet is shown in FIG. 1. One FRL data packet includes a plurality of FRL characters. Each FRL character occupies 16 bits. For the first FRL character of the FRL data packet, the higher 6 bits indicate a type of the entire FRL character, and the lower 6 bits indicate a length of the entire FRL character. The second FRL character and all subsequent FRL characters each are used to carry a TMDS character. One FRL character may carry at least two TMDS characters, and each TMDS character occupies 8 bits. TMDS characters of a same type are usually packaged into a same FRL data packet.

A gap (GAP) data packet is an FRL data packet proposed for rate matching in the HDMI standard protocol version 2.1.

A buffer mainly falls into an input buffer and an output buffer. The input buffer is used to temporarily store data sent by a peripheral, so that a processor can obtain the data. The output buffer is used to temporarily store data sent by the processor to the peripheral. The buffer used in this application is mainly the input buffer.

A multiplexer (MUX) is a circuit that can select one of a plurality of paths of data as required in a process of transmitting the plurality of paths of data. Common specifications are a 4-to-1 MUX, an 8-to-1 MUX, and a 16-to-1 MUX. In this application, a 2-to-1 multiplexer is used, that is, one path of input data is selected from two paths of input data for output.

To describe the technical solutions of this application more clearly, as shown in FIG. 2, a transmission manner specified in the HDMI standard protocol version 2.1 is first described. The transmission manner may be used as an application scenario of this application, but should not be used as a limitation on the application scenario of this application.

As shown in FIG. 2, as specified in the HDMI standard protocol version 2.1, a video signal, an audio signal, and a display control signal are first input to a TMDS character generation module. The TMDS character generation module may convert the input video signal, audio signal, and display control signal into TMDS characters, and then input the TMDS characters to an encryption module for encryption. Finally, the encrypted TMDS characters are divided into two paths: one path of character is input to a TMDS transmission link, and the other path of character is input to an FRL transmission link.

On the TMDS transmission link, an input encrypted TMDS character is processed by a scrambling coding module and then input to a TMDS transmission channel for transmission.

On the FRL transmission link, an input encrypted TMDS character is processed by a data flow control module, an FRL packaging module, an FRL-data-packet-to-character-block mapping module, and a scrambling coding module, and then input to the FRL transmission channel for transmission. The FRL transmission channel usually includes three channels or four channels.

The TMDS transmission link is intended to be compatible with the HDMI standard protocol version 2.0, and the FRL transmission link is a transmission link newly proposed in the HDMI standard protocol version 2.1. A TMDS character transmission rate on the link is greater than a TMDS character input rate on the link. Therefore, to implement rate matching, the data flow control module is added between the encryption module and the FRL packaging module.

It should be noted that, the application scenario shown in FIG. 2 is merely used as an application scenario of this application. In actual application, this application further includes another application scenario. For example, an application scenario may be as follows. The TMDS characters generated by the TMDS character generation module shown in FIG. 2 may be directly divided into two paths and input to the TMDS transmission link and the FRL transmission link respectively, without processing performed by the encryption module.

Based on the foregoing application scenario, this application provides a data flow control method and apparatus. The solutions of this application are described below in detail by using embodiments. For clarity, the embodiments of this application and corresponding accompanying drawings are listed in the following table.

Figure 3A:
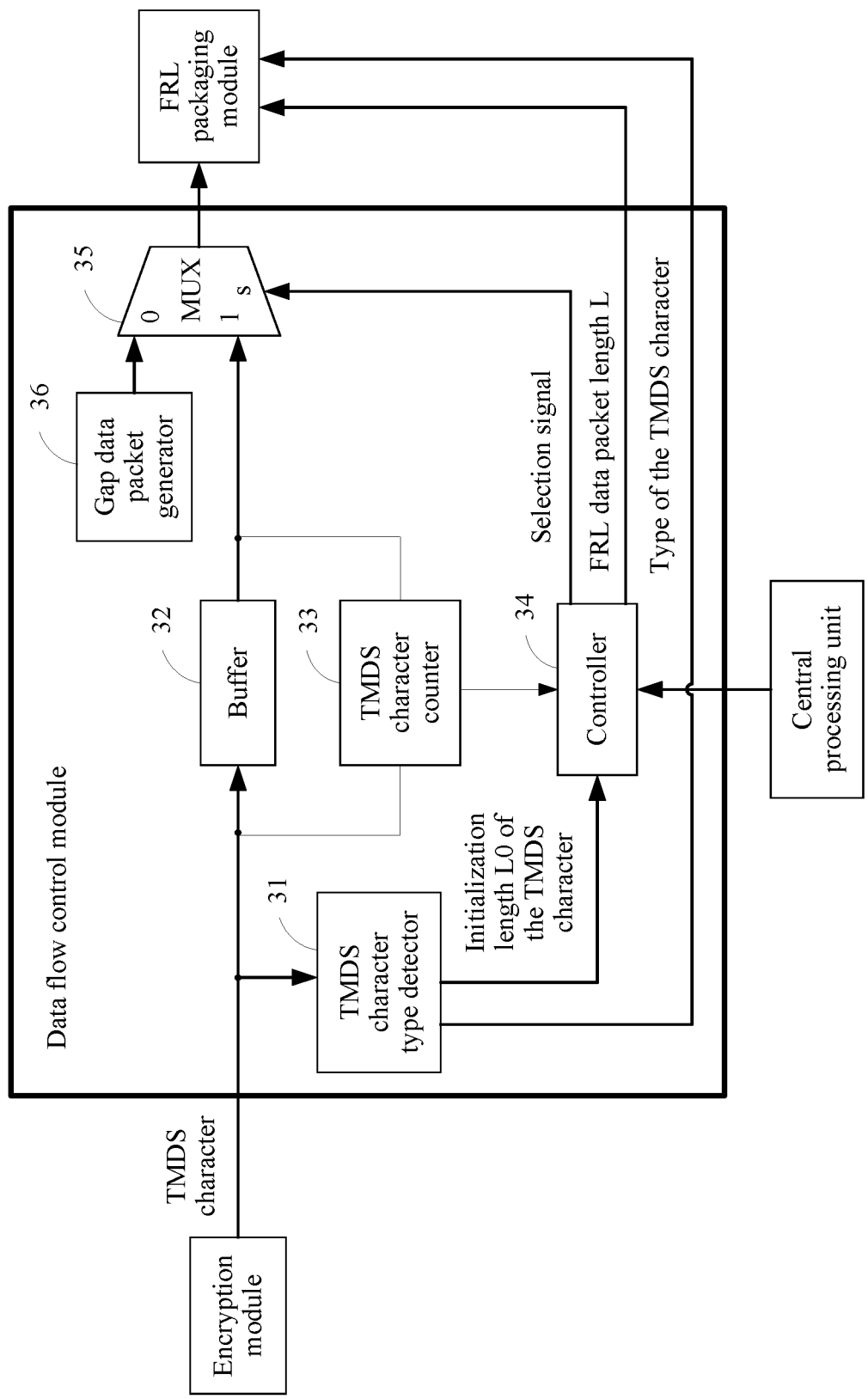
FIG. 3a to FIG. 3c are schematic diagrams of logical structures of a data flow control device according to this application.
Figure 3B:
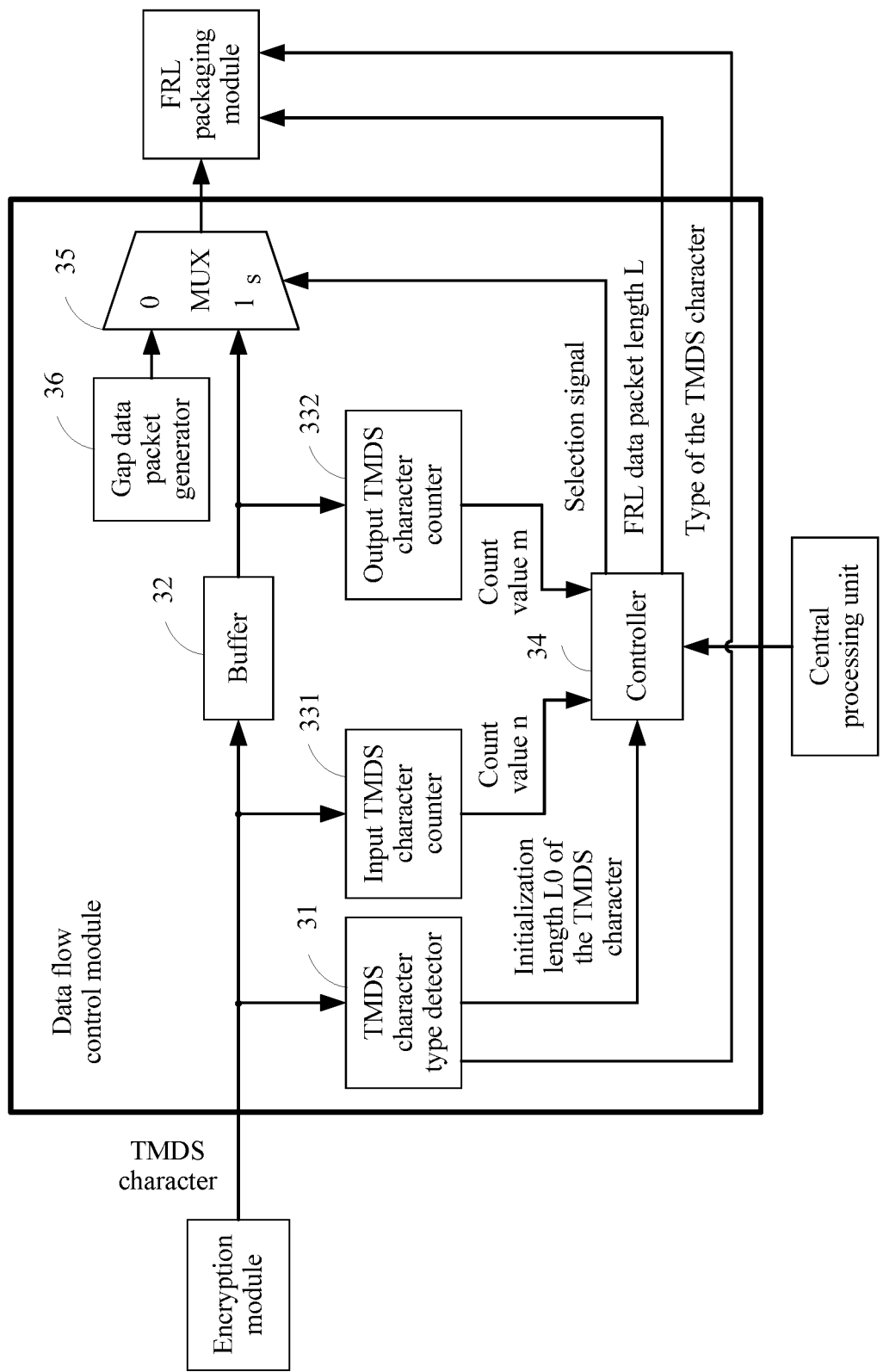
Figure 3C:
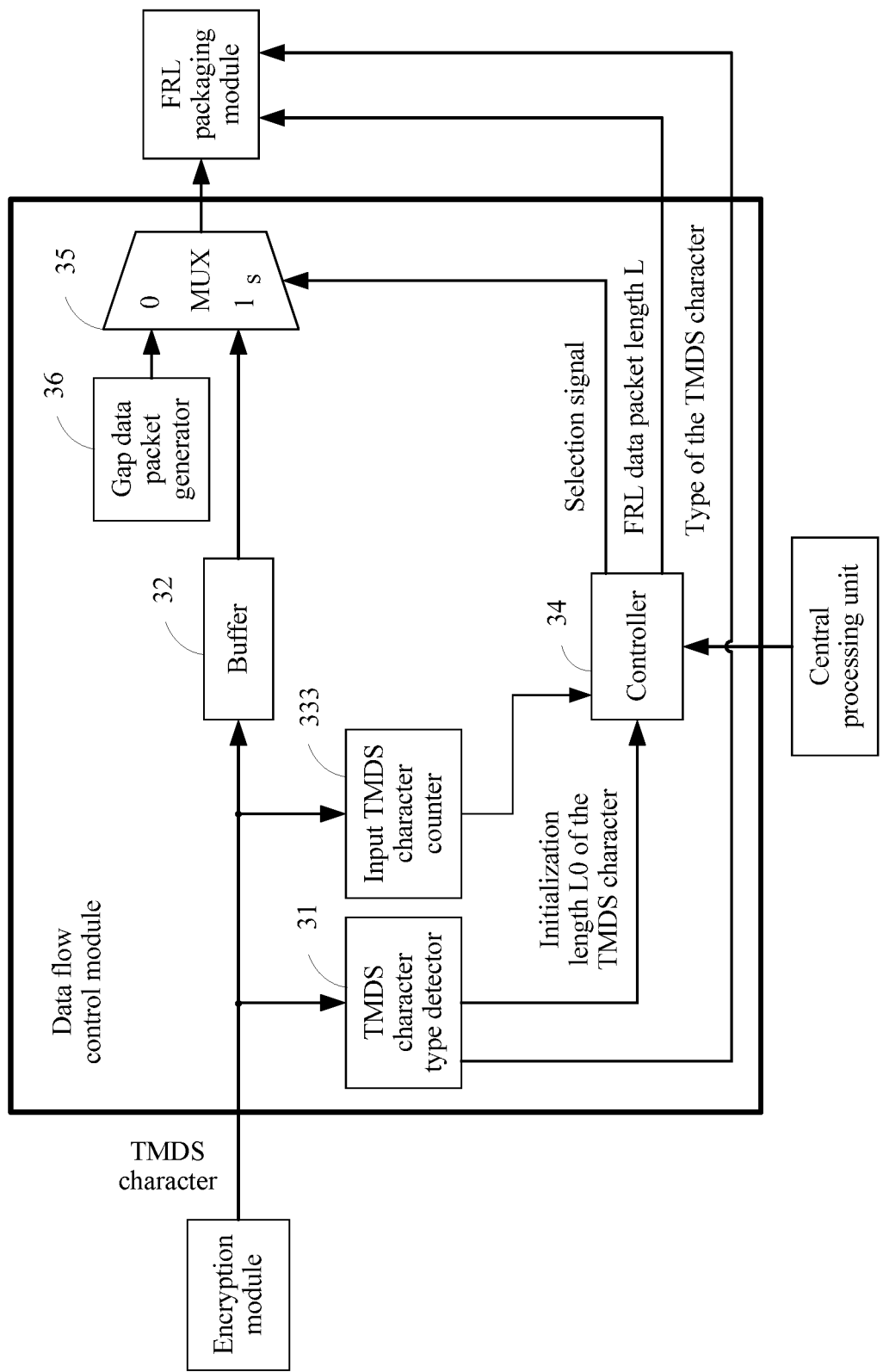
Figure 4:
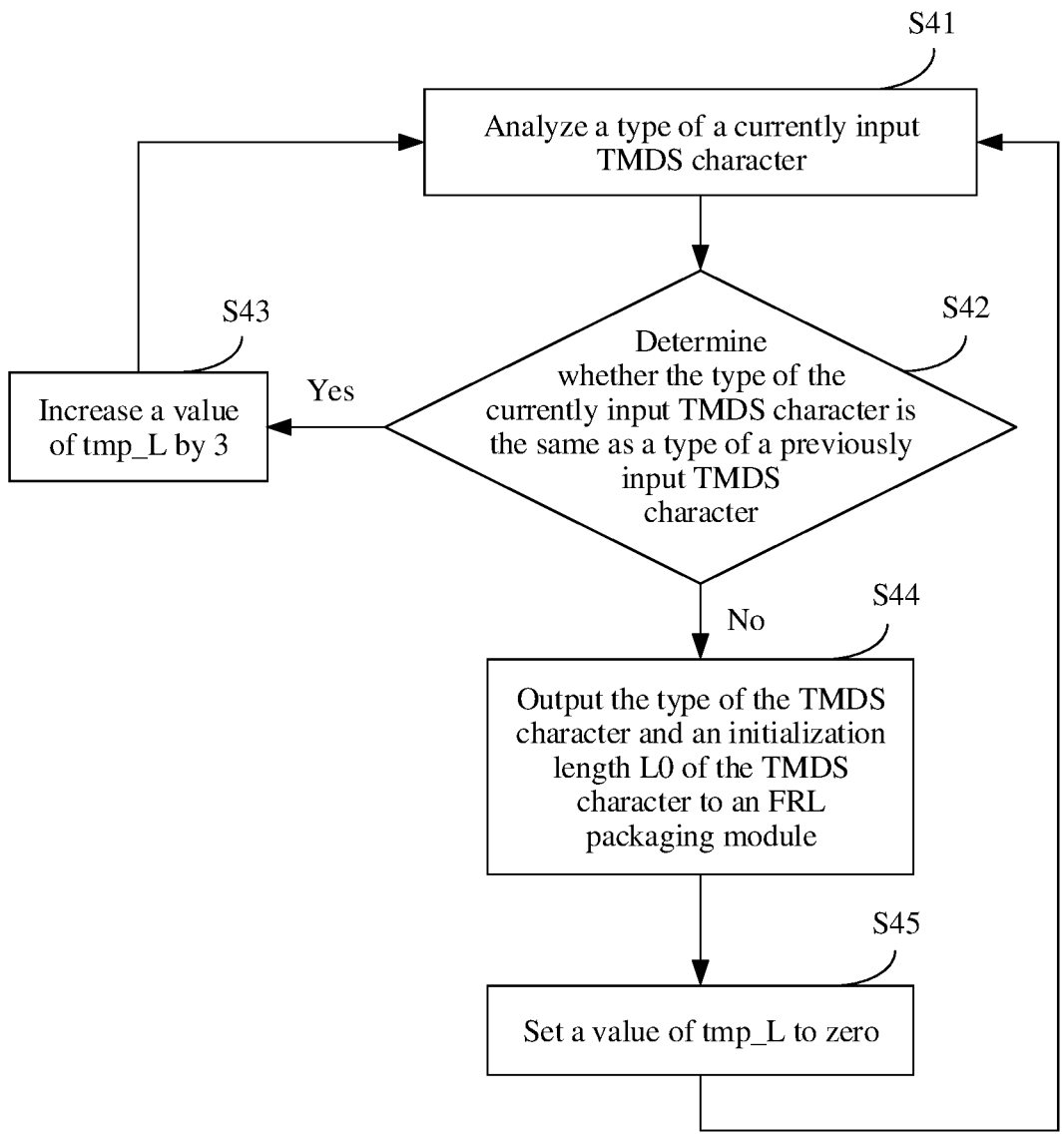
FIG. 4 is a schematic diagram of a processing procedure of a TMDS character type detector according to this application.
Figure 5:
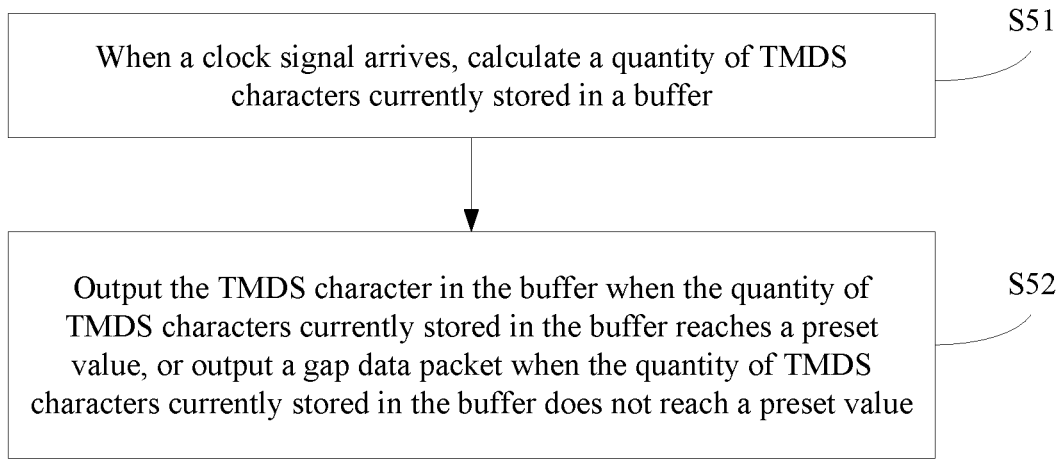
FIG. 5 is a schematic flowchart of a data flow control method according to this application.
Figure 6A:
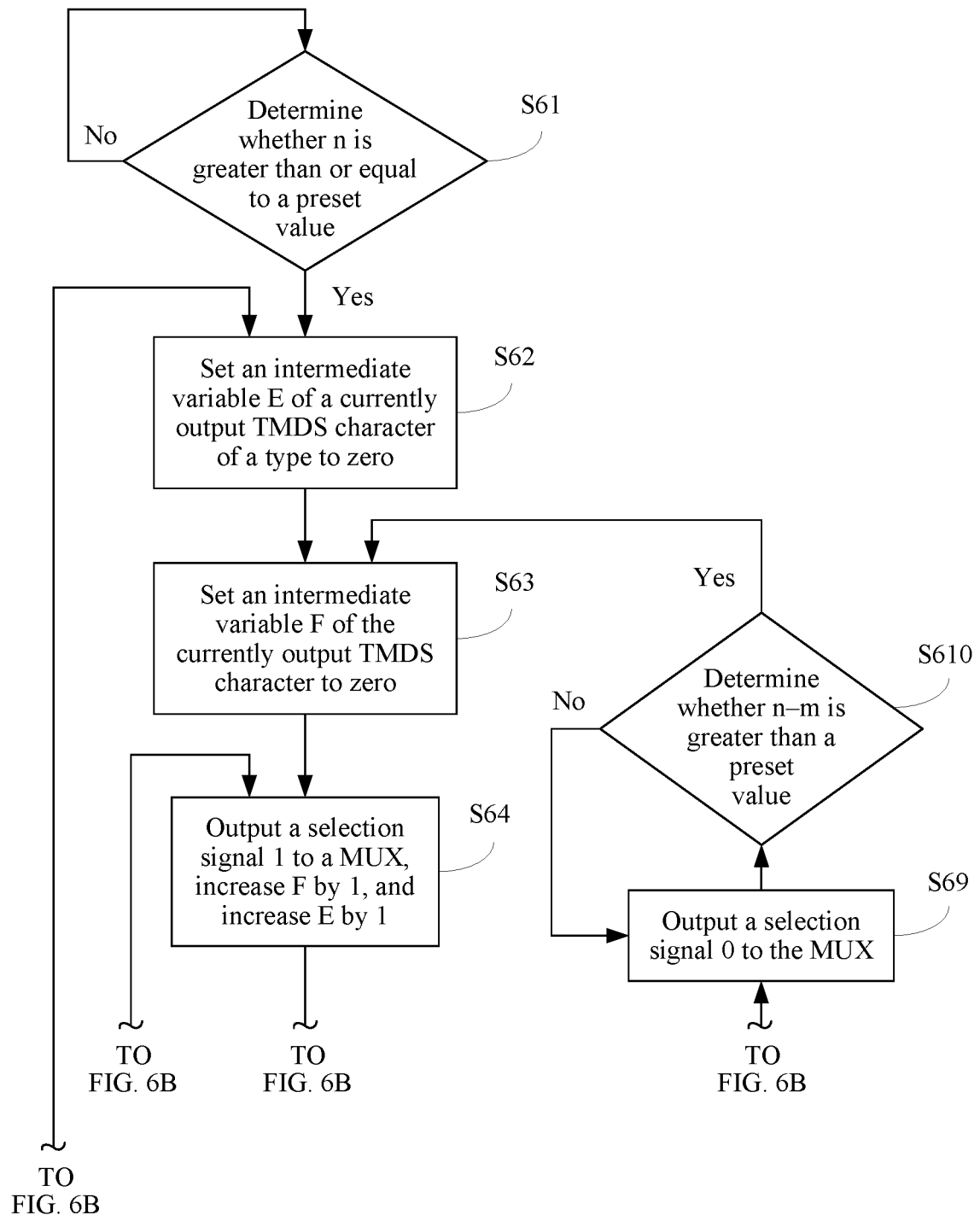
FIG. 6A and FIG. 6B are another schematic flowchart of a data flow control method according to this application.
Figure 6B:
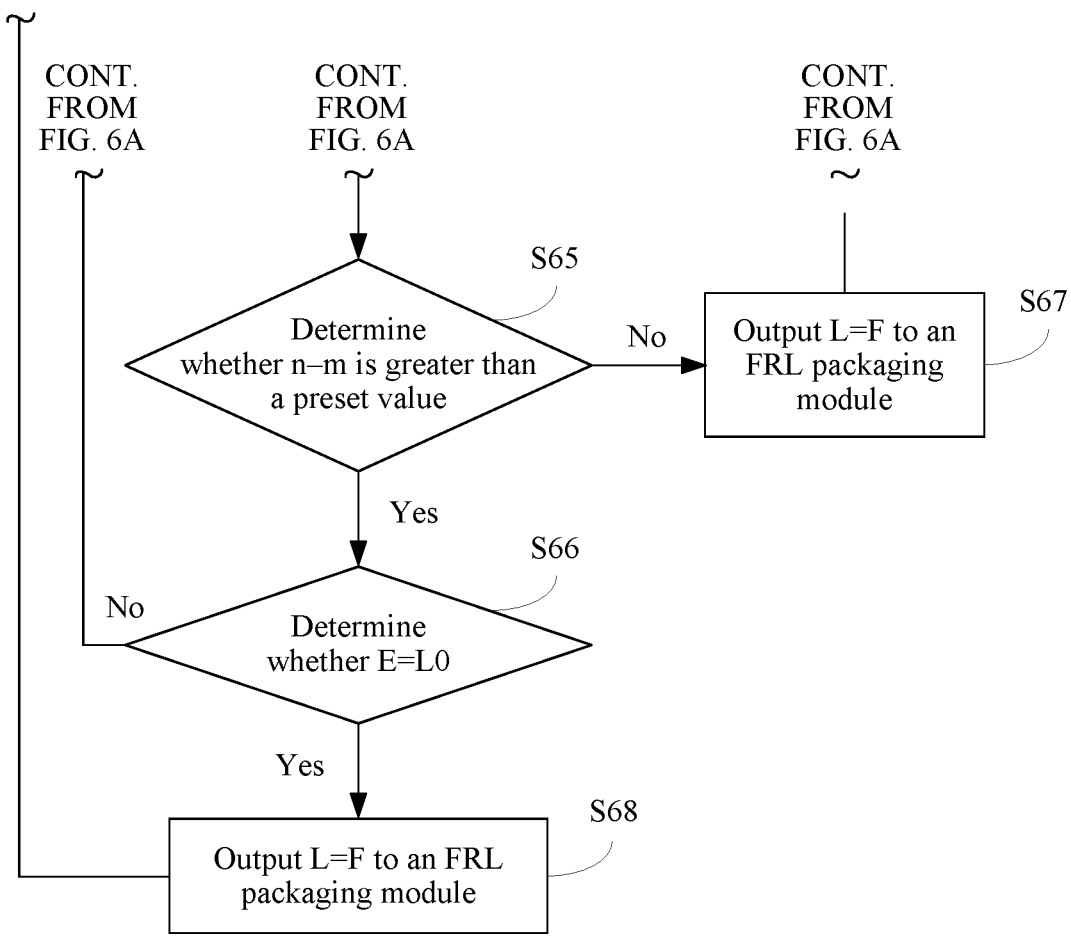
Figure 7A:
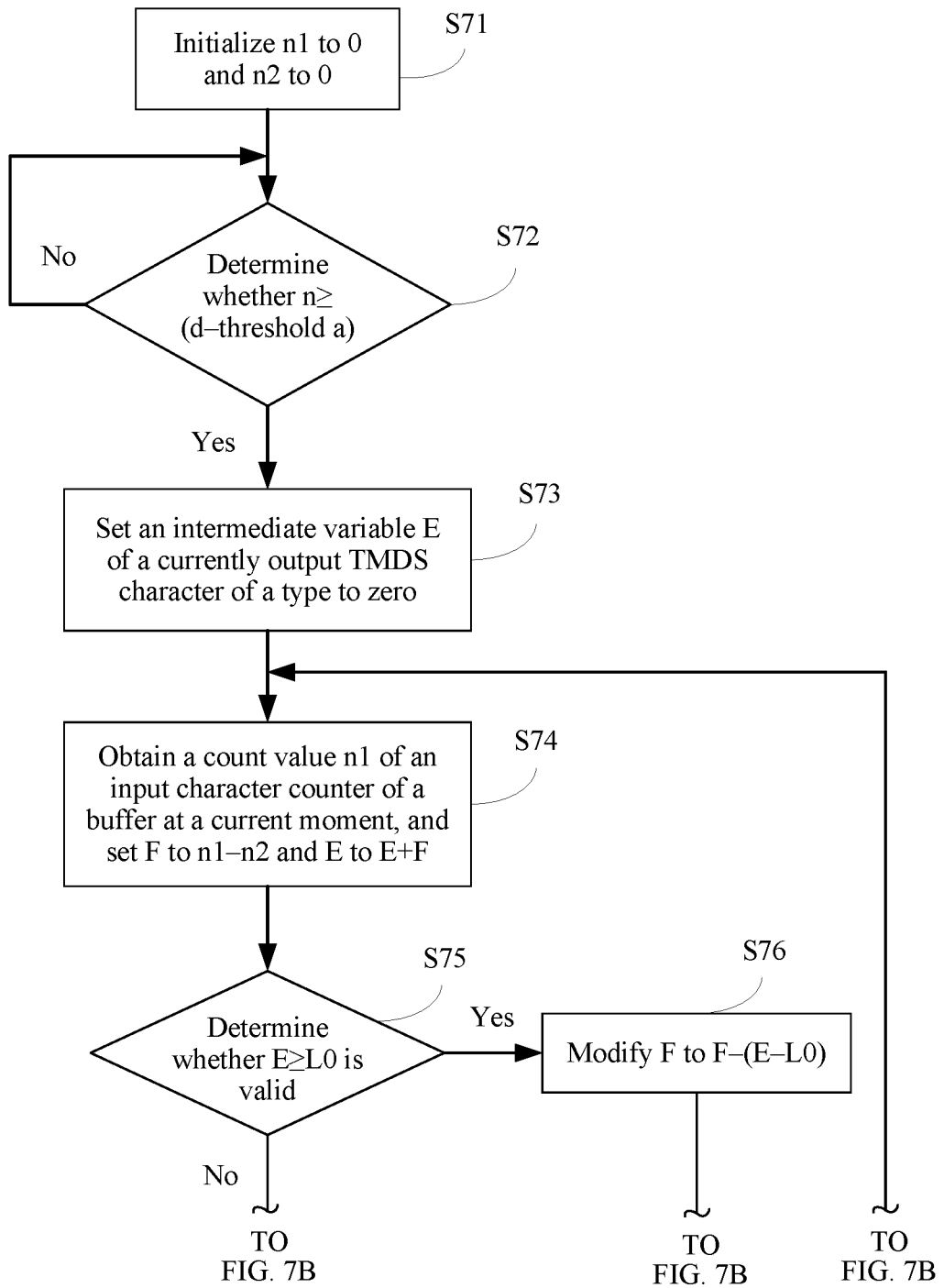
FIG. 7A and FIG. 7B are still another schematic flowchart of a data flow control method according to this application.
Figure 7B:
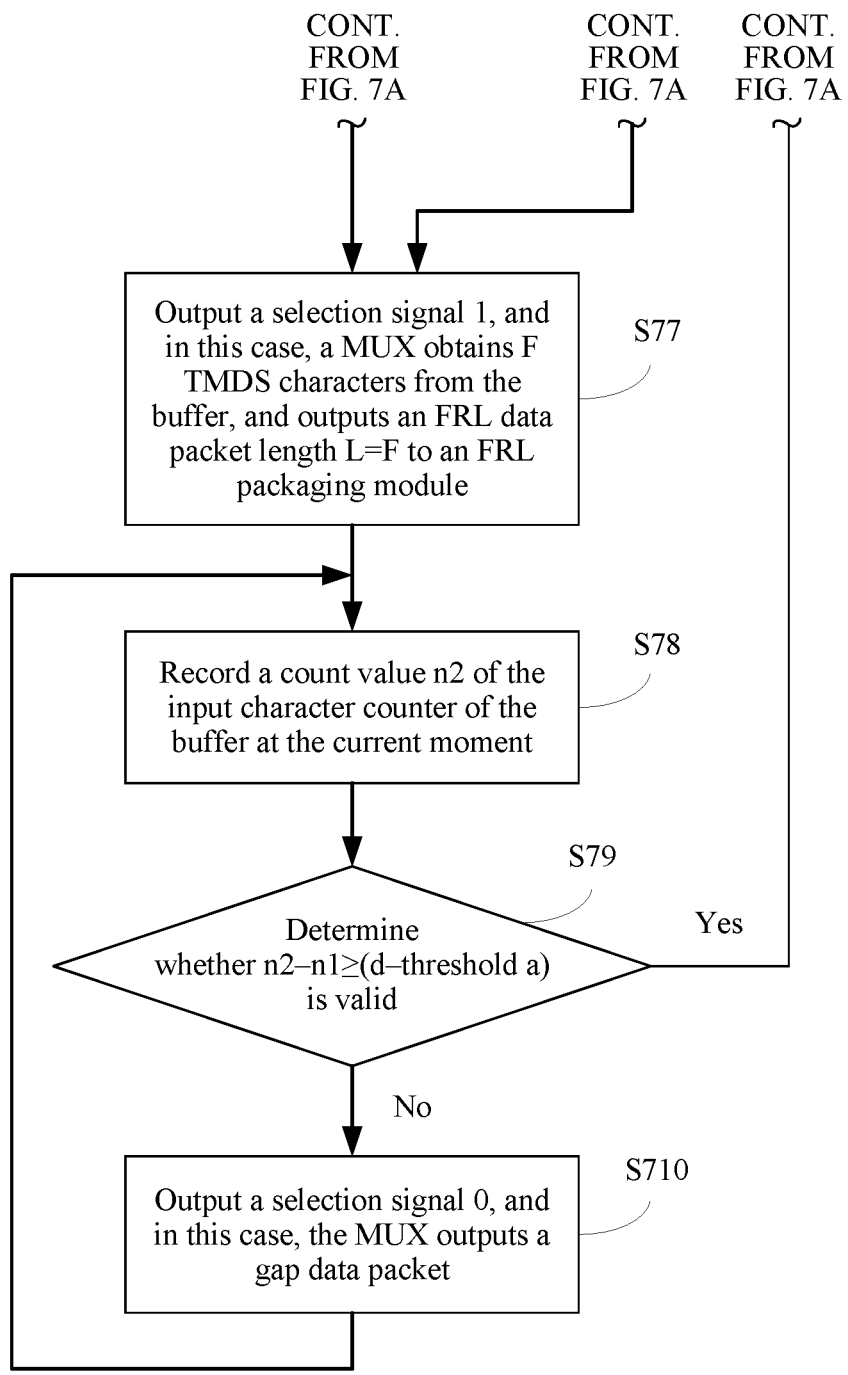
Figure 8:
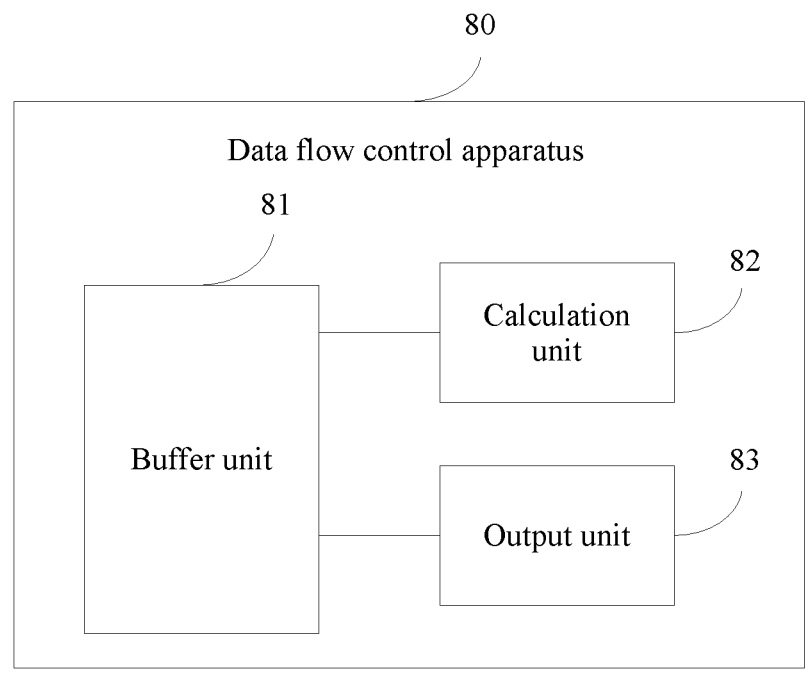
FIG. 8 is a schematic structural diagram of a data flow control apparatus according to this application.
Figure 9:
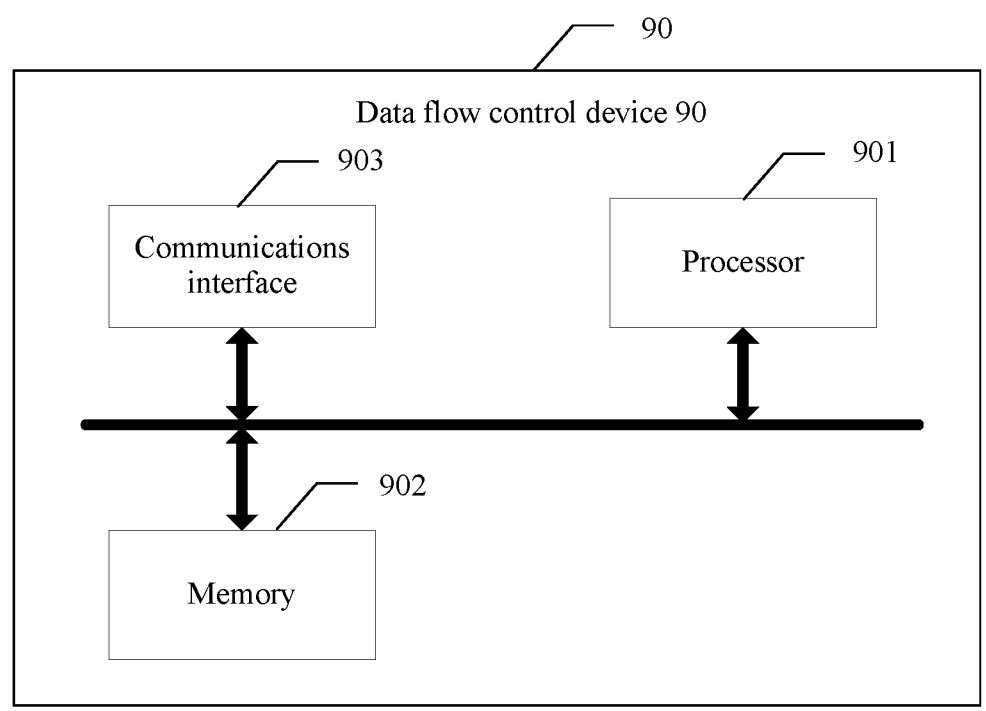
FIG. 9 is another schematic structural diagram of a data flow control device according to this application.

| Embodiment | Content | Accompanying drawings |
|---|---|---|
| Embodiment 1 | Data flow control device | FIG. 3a, FIG. 3b, and FIG. 3c |
| Embodiment 2 | Processing procedure of a TMDS character type detector | FIG. 4 |
| Embodiment 3 | Processing procedure of a controller | FIG. 5 |
| Embodiment 4 | Specific implementation procedure of a controller | FIG. 6A and FIG. 6B |
| Embodiment 5 | Specific implementation procedure of a controller | FIG. 7A and FIG. 7B |
| Embodiment 6 | Schematic structural diagram of a data flow control apparatus | FIG. 8 |
| Embodiment 7 | Schematic structural diagram of a data flow control device | FIG. 9 |

Embodiment 1

As shown in FIG. 3a, this application provides a data flow control device. The device may be a chip in actual application. The device shown in FIG. 3a is mainly used to implement the function of the data flow control module shown in FIG. 2, and mainly includes a TMDS character type detector 31, a buffer 32, a TMDS character counter 33, a controller 34, a MUX 35, and a gap data packet generator 36.

The TMDS character type detector 31 is mainly configured to detect a type of a TMDS character that is input to an FRL link. The TMDS character mainly falls into two types: a blanking area video data type and an effective video data type. The TMDS character type detection is mainly used to detect whether the TMDS character that is input to the FRL link is of the blanking area video data type or the effective video data type. In this application, the TMDS character type detection may mark the blanking area video data type as a type 2, and mark the effective video data type as a type 3.

The buffer 32 is mainly configured to store a TMDS character. A TMDS character storage capacity of a buffer is usually represented by a depth d. For example, if the buffer can store a maximum of 10 TMDS characters, the depth of the buffer is 10.

The TMDS character counter 33 is configured to: record a quantity of TMDS characters input to and/or output from the buffer 32, and send the recorded quantity of TMDS characters to the controller 34.

In this application, a count value of the TMDS character counter 33 may be increased by 1 each time one TMDS character is input. A count value may alternatively be increased by 1 each time two TMDS characters are input. A user may set a count rule as required.

The controller 34 is mainly configured to: when a clock signal arrives, calculate, based on the quantity of TMDS characters that is recorded by the TMDS character counter 33, a quantity of TMDS characters currently stored in the buffer 32, and send a first control signal to the MUX 35 when the quantity of TMDS characters currently stored in the buffer 32 reaches a preset value, or send a second control signal to the MUX 35 when the quantity of TMDS characters currently stored in the buffer 32 does not reach a preset value. A cycle of the clock signal is set based on a TMDS character transmission rate on the fixed rate link FRL. For example, as specified in the HDMI standard protocol version 2.1, if eight TMDS characters are transmitted per second on the FRL transmission link, the cycle of the clock signal may be specifically $\frac{1}{8}=0.125$ s, that is, one clock control signal is output every 0.125 second. The clock control signal may be specifically generated by a central processing unit of an entire transmission device. The entire transmission terminal may be specifically a terminal that transmits a video or audio. For example, if a video signal, an audio signal, and a display control signal are transmitted from a set-top box to a television, the entire transmission terminal may be specifically the set-top box, and an HDMI interface is used to transmit data between the set-top box and the television. In this case, the set-top box may perform the processing process shown in FIG. 2 on the video signal, the audio signal, and the display control signal that are received by using a cable television network, to finally input the video signal, the audio signal, and the display control signal to the television on two transmission links: a TMDS transmission link and the FRL transmission link. An output clock cycle of the FRL link may be specifically set by a central processing unit of the set-top box.

The MUX 35 is configured to: when receiving the first control signal from the controller 34, output the TMDS character in the buffer 32, or when receiving the second control signal from the controller 34, output a gap data packet generated by the gap data packet generator 36.

For example, when the controller 34 sends a selection signal 1, the MUX 35 outputs one TMDS character from the buffer 32 to an FRL packaging module; or when the controller 34 sends a selection signal 0, the MUX 35 outputs one gap data packet from the gap data packet generator 36 to an FRL packaging module.

The gap data packet generator 36 is configured to generate a gap data packet.

It should be noted that, the controller 34 is further configured to output an FRL data packet length L to the FRL packaging module. The FRL data packet length is L=L0/2. L0 is a length of an input TMDS character of a type. The TMDS character type detector 31 is further configured to output the type of the TMDS character to the FRL packaging module. The FRL packaging module packages an output TMDS character based on the type of the TMDS character and L, and finally packages the TMDS character into an FRL data packet. For a format of the FRL data packet, refer to FIG. 1.

It should be further noted that, the TMDS character generated by the TMDS character generation module in FIG. 2 may be directly input to the FRL link, or may be processed by the encryption module shown in FIG. 2, and then an encrypted TMDS character is input to the FRL link. FIG. 3a is only an example of this application, and should not be used as a limitation on this application.

It can be learned that, in this application, each time the clock signal of the FRL link arrives, the controller 34 outputs one TMDS character or one gap data packet to the FRL packaging module, so that a transmission rate requirement of the FRL link can be met.

As shown in FIG. 3b, in an example, the TMDS character counter 33 in FIG. 3a may specifically include an input TMDS character counter 331 and an output TMDS character counter 332.

In an optional manner, the TMDS character type detector 31 is mainly configured to detect a type of a TMDS character that is input to an FRL link. The TMDS character mainly falls into two types: a blanking area video data type and an effective video data type. The TMDS character type detection is mainly used to detect whether the TMDS character that is input to the FRL link is of the blanking area video data type or the effective video data type. In this application, the TMDS character type detection may mark the blanking area video data type as a type 2, and mark the effective video data type as a type 3.

The buffer 32 is mainly configured to store a TMDS character. A TMDS character storage capacity of a buffer is usually represented by a depth d. For example, if the buffer can store a maximum of 10 TMDS characters, the depth of the buffer is 10.

The input TMDS character counter 331 is mainly configured to record a quantity of TMDS characters that are input to the buffer 32.

The output TMDS character counter 332 is mainly configured to record a quantity of TMDS characters that are output from the buffer 32.

The controller 34 is mainly configured to: when a clock signal arrives, obtain a first count value currently recorded by the input TMDS character counter 331 and a second count value recorded by the output TMDS character counter 332, where the first count value is used to indicate a quantity that is of TMDS characters input to the buffer and that is currently recorded by the input TMDS character counter, and the second count value is used to indicate a quantity that is of TMDS characters output from the buffer and that is currently recorded by the output TMDS character counter; and use a difference between the first count value and the second count value as a quantity of TMDS characters currently stored in the buffer. In addition, when the quantity of TMDS characters currently stored in the buffer reaches a preset value, the controller outputs a first control signal to the MUX 35. When the quantity of TMDS characters currently stored in the buffer does not reach a preset value, the controller outputs a second control signal to the MUX 35.

The MUX 35 is mainly configured to: when receiving the first control signal, output one TMDS character in the buffer 32, or when receiving the second control signal, output one gap data packet.

The gap data packet generator 36 is mainly configured to generate a gap data packet.

In an optional manner, when a first clock signal arrives, the controller 34 calculates the quantity of TMDS characters currently stored in the current buffer 32. For a calculation manner, refer to the foregoing descriptions. Then, when the quantity of TMDS characters currently stored in the buffer 32 reaches the preset value, the controller 34 sends the first control signal to the MUX 35, and the MUX 35 outputs one TMDS character in the buffer 32. When a second clock signal to an $I^{th}$ clock signal that are subsequent to the first clock signal arrive, the controller 34 directly sends the first signal clock to the MUX 35, without performing the steps of calculating a storage capacity of the buffer 32 and determining whether the storage capacity of the buffer 32 reaches the preset value, where I is greater than or equal to 2 and is less than or equal to M, and M is the quantity of TMDS characters currently stored in the buffer 32. For example, when a clock signal 1 arrives, the controller 34 learns, through calculation, that the quantity of TMDS characters currently stored in the buffer 32 is 5. In this case, the controller 34 continues to determine whether the quantity of TMDS characters currently stored in the buffer 32 reaches the preset value. It is assumed that the preset value is 3. It can be learned that the quantity 5 of TMDS characters currently stored in the buffer 32 has already reached the preset value 3. In this case, the controller 34 sends the first control signal to the MUX 35. When receiving the first control signal, the MUX 35 outputs one TMDS character in the buffer 32. Subsequently, when a plurality of clock signals subsequent to the clock signal 1 arrive, the controller 34 directly outputs the first control signal to the MUX 35, and the MUX 35 continues to output the TMDS character. Certainly, a value of a quantity of the plurality of clock signals subsequent to the clock signal 1 may be set by a user, but the value needs to be less than the quantity of TMDS characters currently stored in the buffer 32. When another clock signal subsequent to the plurality of clock signals arrives, it may be considered that the clock signal 1 arrives again, and the controller 34 continues to execute the foregoing process.

As shown in FIG. 3c, in an example, the TMDS character counter 33 in FIG. 3a may specifically include an input TMDS character counter 333.

The TMDS character type detector 31 is mainly configured to detect a type of a TMDS character that is input to an FRL link. The TMDS character mainly falls into two types: a blanking area video data type and an effective video data type. The TMDS character type detection is mainly used to detect whether the TMDS character that is input to the FRL link is of the blanking area video data type or the effective video data type. In this application, the TMDS character type detection may mark the blanking area video data type as a type 2, and mark the effective video data type as a type 3.

The buffer 32 is mainly configured to store a TMDS character. A TMDS character storage capacity of a buffer is usually represented by a depth d. For example, if the buffer can store a maximum of 10 TMDS characters, the depth of the buffer is 10.

The input TMDS character counter 333 is mainly configured to record a quantity of TMDS characters that are input to the buffer 32.

The controller 34 is mainly configured to: when a clock signal arrives, obtain a third count value and a fourth count value that are recorded by the input TMDS character counter 333, where the third count value is used to indicate a quantity that is of TMDS characters input to the buffer and that is recorded by the input TMDS character counter 333 until the buffer 32 outputs the last stored TMDS character previous time, and the fourth count value is used to indicate a quantity that is of TMDS characters input to the buffer and that is currently recorded by the input TMDS character counter 333; and use a difference between the fourth count value and the third count value as a quantity of TMDS characters currently stored in the buffer.

Specifically, in an optional implementation, when a first clock signal arrives, the controller 34 calculates the quantity of TMDS characters in the buffer 32. When the quantity of TMDS characters currently stored in the buffer 32 reaches a preset value, the controller 34 sends a first control signal to the MUX 35. When a second clock signal to an $M^{th}$ clock signal that are subsequent to the first clock signal, each arrive, the controller 34 sends the first control signal to the MUX 35.

The MUX 35 is mainly configured to: when receiving the first control signal, output one TMDS character in the buffer 32, or when receiving a second control signal, output one gap data packet.

The gap data packet generator 36 is mainly configured to generate a gap data packet.

Embodiment 2

In this embodiment of this application, a working process of the TMDS character type detector 31 in FIG. 3a, FIG. 3b, or FIG. 3c is described in detail. As shown in FIG. 4, details are as follows.

Step S41. Analyze a type of a currently input TMDS character.

Step S42. Determine whether the type of the currently input TMDS character is the same as a type of a previously input TMDS character; and perform step S43 if the types are the same; or perform step S44 if the types are not the same.

Step S43. Increase a value of a temporary variable tmp_L of a TMDS character length by 3.

In actual application, each TMDS character occupies 3 bytes. Therefore, each time one TMDS character is input, the value of tmp_L is increased by 3.

Step S44. Output the type of the TMDS character and an initialization length L0 of the TMDS character to an FRL packaging module.

In this application, the TMDS character mainly falls into two types: a blanking area video data type and an effective video data type. Specifically, a type identifier of the blanking area video data type is 2, a type identifier of the effective video data type is 3, and L0=tmp_L/2.

It can be learned from the example of the FRL data packet in FIG. 1 that an FRL character in each FRL data packet occupies two TMDS characters. Therefore, when an initial length L0 of FRL data is output, tmp_L of the TMDS length needs to be divided by 2, and an obtained result is used as a length of the FRL character in the FRL data packet.

Step S45. Set a value of a temporary variable tmp_L of a TMDS character length to zero.

It can be learned that, according to the foregoing method, it can be ensured that types of TMDS characters in one FRL data packet are consistent.

Embodiment 3

In this application, a working process of the controller 34 in FIG. 3a, FIG. 3b, or FIG. 3c is described in detail. Each time an output signal arrives, the controller 34 outputs one TMDS character from a buffer 32 or one gap data packet to an FRL packaging module. In addition, a storage capacity of the entire buffer 32 is limited. As a result, if gap data packets are continuously output when a clock signal arrives, overflow may occur in the buffer 32. The overflow means that a quantity of input TMDS characters exceeds the storage capacity of the buffer 32, causing a TMDS character loss. If TMDS characters are continuously output when a clock signal arrives, because a TMDS character input rate is less than a TMDS character transmission rate on an FRL link, underflow may occur in the buffer 32. The underflow means that there is still a requirement for a TMDS character output from the buffer 32 when the entire buffer 32 has no TMDS character. Both the overflow and the underflow in the buffer 32 may destroy an original TMDS character inherent display time sequence.

To resolve a problem that the TMDS character inherent display time sequence is destroyed, this application provides a data flow control method. This method can be used to ensure that neither overflow nor underflow occurs in the buffer 32, so that the TMDS character inherent display time sequence is maintained. As shown in FIG. 5, the method is specifically as follows.

Step S51. When a clock signal arrives, calculate a quantity of TMDS characters currently stored in the buffer 32.

Step S52. Output the TMDS character in the buffer when the quantity of TMDS characters currently stored in the buffer 32 reaches a preset value, or output a gap data packet when the quantity of TMDS characters currently stored in the buffer 32 does not reach a preset value, where the preset value is set based on a TMDS character storage capacity of the buffer, and the preset value is less than or equal to the TMDS character storage capacity of the buffer.

In an implementation, when the clock signal arrives, a first total quantity of TMDS characters currently input to the buffer 32 and a second total quantity of TMDS characters currently output from the buffer are obtained; and a difference between the first total quantity and the second total quantity is used as the quantity of TMDS characters currently stored in the buffer. When the quantity of TMDS characters currently stored in the buffer reaches the preset value, one TMDS character stored in the buffer is output.

In an implementation, when a first clock signal arrives, a first total quantity of TMDS characters currently input to the buffer 32 and a second total quantity of TMDS characters currently output from the buffer are obtained; and a difference between the first total quantity and the second total quantity is used as the quantity of TMDS characters currently stored in the buffer. When the quantity of TMDS characters currently stored in the buffer reaches the preset value, one TMDS character stored in the buffer is output. When a second clock signal to an $I^{th}$ clock signal that are subsequent to the first clock signal, each arrive, one TMDS character stored in the buffer 32 is output, where I is greater than or equal to 2 and is less than or equal to M, M is the quantity of TMDS characters currently stored in the buffer, and both I and M are integers.

In an implementation, when a first clock signal arrives, a third total quantity of TMDS characters input to the buffer 32 and a fourth total quantity of TMDS characters input to the buffer 32 are obtained, where the third total quantity is a total quantity of TMDS characters input to the buffer 32 until the buffer 32 outputs the last stored TMDS character previous time, and the fourth total quantity is a total quantity of TMDS characters input to the buffer 32 at a current moment; and a difference between the fourth total quantity and the third total quantity is used as the quantity of TMDS characters currently stored in the buffer 32. When the quantity of TMDS characters currently stored in the buffer 32 reaches the preset value, one TMDS character in the buffer 32 is output. When a second clock signal to an $M^{th}$ clock signal that are subsequent to the first clock signal, each arrive, one TMDS character stored in the buffer 32 is output, where M is a quantity of TMDS characters stored in the buffer 32. It can be learned from the foregoing descriptions that, in this application, when a clock signal arrives, the quantity of TMDS characters stored in the buffer 32 is calculated. When the quantity of stored TMDS characters reaches the preset value, it indicates that the storage capacity of the buffer 32 is to be full, and the TMDS character is output from the buffer 32. When the quantity of stored TMDS characters does not reach the preset value, the gap data packet is output. According to the foregoing method, it can be ensured that neither overflow nor underflow occurs in the buffer 32, so that the TMDS character inherent display time sequence is maintained.

Embodiment 4

This application provides a specific implementation of a data flow control method. The method may be specifically implemented based on the data flow control device shown in FIG. 3b. A principle of the method is as follows. When each clock signal arrives, a terminal obtains a first total quantity of TMDS characters currently input to the buffer 32 and a second total quantity of TMDS characters currently output from the buffer 32, and uses a difference between the first total quantity and the second total quantity as a quantity of TMDS characters currently stored in the buffer 32. When the quantity of TMDS characters currently stored in the buffer 32 reaches a preset value, the terminal outputs one TMDS character in the buffer 32. When the quantity of TMDS characters currently stored in the buffer 32 does not reach a preset value, the terminal outputs a gap data packet.

As shown in FIG. 6A and FIG. 6B, a specific implementation process of the data flow control method provided in this application is as follows.

Step S61. Determine whether a current count value n of an input character counter of the buffer 32 is greater than or equal to a preset value, where the preset value may be specifically equal to a value obtained by subtracting a threshold a from a depth d of the buffer 32, and the threshold a may be set by a user as required; and if the current count value n is greater than or equal to the preset value, perform step S62; or if the current count value n is not greater than or equal to the preset value, continue to perform step S61, until n is greater than or equal to the preset value.

In actual application, TMDS characters are continuously input to the buffer 32. Therefore, step S61 is mainly used to ensure that output is performed after there is a specific quantity of TMDS characters in the buffer 32.

Step S62. Set an intermediate variable E of a currently output TMDS character of a type to zero.

Step S63. Set an intermediate variable F of the currently output TMDS character to zero.

Step S64. Output a selection signal 1 to a MUX 35, increase F by 1, and increase E by 1, where when the selection signal 1 is output, the MUX 35 outputs a TMDS character from the buffer 32.

Step S65. Determine whether a difference between n and m is greater than a preset value, where n is a quantity of all TMDS characters input to the buffer 32 from a TMDS character input start moment to a current moment, m is a quantity of all TMDS characters output from the buffer 32 from a TMDS character output start moment at which the current moment, the preset value may be specifically a difference between the depth d of the buffer 32 and a threshold d, and a value of the threshold d may be set by the user as required; and perform step S66 if the difference between n and m is greater than the preset value; or perform step S67 if the difference between n and m is not greater than the preset value.

In this application, the difference between n and m represents the quantity of TMDS characters currently stored in the buffer 32. If the difference between n and m is greater than the preset value, it indicates that a relatively large quantity of TMDS characters are further stored in a memory of the buffer 32. In this case, the terminal may continue to output the TMDS character from the buffer 32. If the difference between n and m is not greater than the preset value, the terminal outputs the gap data packet.

Step S66. Determine whether E is equal to Lo; and perform step S68 if E is equal to Lo; or continue to perform step S64 if E is not equal to Lo.

In this application, L0 represents a quantity of TMDS characters that are of a type and that are input to the buffer 32. If E is equal to Lo, it indicates that the TMDS characters of the type are fully output from the buffer 32. In this case, step S68 is performed. If E is not equal to Lo, the terminal continues to output the TMDS character from the buffer 32.

Step S68. Output L=F to an FRL packaging module, so that the FRL packaging module packages the output TMDS character based on the type of the TMDS character and the length L.

Step S67. Output L=F to an FRL packaging module, so that the FRL packaging module packages the currently output TMDS character of the type.

Step S69. Output a selection signal 0 to the MUX 35, where when the selection signal 0 is output, the MUX 35 outputs a gap data packet to the FRL packaging module.

Step S610. Determine whether the difference between n and m is greater than a preset value, where the preset value may be specifically a difference between the depth of the buffer 32 and a threshold c, and a value of the threshold c may be set by the user; and if the difference between n and m is greater than the preset value, continue to perform step S63; or if the difference between n and m is not greater than the preset value, perform step S69 to continue to output a gap data packet to the FRL packaging module.

It can be learned from the foregoing descriptions that, in this embodiment of this application, each time one TMDS character and one gap data packet are output from the buffer 32, the terminal determines whether the difference between n and m is greater than the preset value. In addition, because it is mentioned in the background that a TMDS character input rate on an FRL transmission link is less than a TMDS character output rate, a quantity of TMDS characters stored in the buffer 32 at each moment is very small. Therefore, in this application, a very small depth d may be designed for the buffer 32. It can be learned that, according to the data method, the buffer 32 with a very low storage capacity may be used for implementation, and a requirement on a hardware device is relatively low.

Embodiment 5

This application provides another specific implementation of a data flow control method. The method may be specifically implemented based on the data flow control device shown in FIG. 3c. A principle of the method is as follows. It is assumed that a quantity of TMDS characters currently stored in a buffer 32 is M, where M is an integer. In this case, when a first clock signal arrives, a terminal obtains a third total quantity of TMDS characters input to the buffer 32 at a current moment and a fourth total quantity of TMDS characters input to the buffer 32 until the buffer 32 outputs the last stored TMDS character most recently. The terminal uses a difference between the fourth total quantity and the third total quantity as the quantity of TMDS characters currently stored in the buffer 32. When the quantity of TMDS characters currently stored in the buffer 32 is greater than a preset value, the terminal outputs one TMDS character from the M TMDS characters to an FRL packaging module. When a second clock signal to an $M^{th}$ clock signal that are subsequent to the first clock signal arrive, the terminal successively outputs one TMDS character from the buffer 32 to the FRL packaging module. To be specific, it is assumed that M TMDS characters are stored in the buffer 32. In this case, when the first clock signal arrives, the terminal determines whether the quantity of TMDS characters currently stored in the buffer 32 is greater than the preset value. If the quantity of TMDS characters currently stored in the buffer 32 is greater than the preset value, the terminal selects one TMDS character from the M TMDS characters and outputs the TMDS character to the FRL packaging module. Then, when the second clock signal arrives, the terminal selects another TMDS character from the M−1 TMDS characters and outputs the TMDS character to the FRL packaging module, and by analogy, until the M TMDS characters are fully output. Subsequently, when a clock signal arrives again, the terminal determines again whether the quantity of TMDS characters currently stored in the buffer 32 is greater than the preset value. If the quantity of TMDS characters currently stored in the buffer 32 is greater than the preset value, the terminal executes the process again. If the quantity of TMDS characters currently stored in the buffer 32 is not greater than the preset value, the terminal outputs a gap data packet.

As shown in FIG. 7A and FIG. 7B, a specific implementation process of the data flow control method provided in this application is as follows.

Step S71. Initialize n1 to 0 and n2 to 0, where n1 represents a total quantity of TMDS characters input to the buffer 32 at a current moment, and n2 represents a total quantity of TMDS characters input to the buffer 32 until the buffer 32 outputs the last stored TMDS character most recently.

Step S72. Determine whether a current count value n of an input character counter of the buffer 32 is greater than or equal to a preset value, where the preset value may be specifically equal to a value obtained by subtracting a threshold a from a depth d of the buffer 32, and the threshold a may be set by a user as required; and if the current count value n is greater than or equal to the preset value, perform step S73; or if the current count value n is not greater than or equal to the preset value, continue to perform step S71, until n is greater than or equal to the preset value.

Step S73. Set an intermediate variable E of a currently output TMDS character of a type to zero.

Step S74. Obtain a count value n1 of the input character counter of the buffer 32 at the current moment, and set F to n1-n2 and E to E+F.

F represents a quantity of TMDS characters stored in the buffer 32 at the current moment, and E represents a cumulative quantity of output TMDS characters.

Step S75. Determine whether E≥L0 is valid, where L0 represents a length of an input TMDS character of a type; and perform step S76 if the inequality is valid; or perform step S77 if the inequality is not valid.

Because E is not set to zero, when step S74 is performed after a gap data packet is output, E may be greater than Lo. In this case, the length of the TMDS character of the type needs to be recalculated. For a specific calculation formula, refer to step S76.

Step S76. Modify F to F-(E-Lo).

In this application, it is assumed that a quantity of TMDS characters of a type that are input to an FRL transmission link is 8. However, a storage capacity of the buffer 32 is limited, and only five TMDS characters are stored in the buffer 32. In this case, the five TMDS characters may be simultaneously output by using step S77 and packaged into one FRL data packet. In addition, TMDS characters are continuously input to the buffer 32. In this case, the terminal continues to perform step S78 and step S79. If a condition is met in S79, the terminal goes back to continue to perform S74. In S74, F is set to the quantity of TMDS characters currently stored in the buffer 32. In this case, in addition to the three remaining TMDS characters, another TMDS character is input. E is set to a sum of a quantity of TMDS characters input to the buffer 32 previous time and a quantity of TMDS characters currently input to the buffer 32. The TMDS characters currently input to the buffer 32 include the three TMDS characters that are of a same type and that are remained previous time and a TMDS character of another type. L0 represents the eight TMDS characters input to the buffer 32 previous time. E-L0 represents the currently input TMDS character of the another type. F-(E-Lo) represents the three TMDS characters remained previous time. The three remaining TMDS characters may be packaged into one data packet by using step S77 subsequently. To be specific, in this application, if a quantity of initially input TMDS characters of a type is greater than the storage capacity of the buffer 32, the TMDS characters of the type may be packaged into a plurality of FRL data packets, and the gap data packet may be inserted between different FRL data packets.

Step S77. Output a selection signal 1, and in this case, a MUX 35 obtains F TMDS characters from the buffer 32, and outputs an FRL data packet length L=F to the FRL packaging module.

Step S78. Record a count value n2 of the input character counter of the buffer 32 at a moment when the last TMDS character is output from the buffer 32.

Step S79. Determine whether n2−n1≥(d-threshold a) is valid; and continue to perform step S74 if the inequality is valid; or perform step S710 if the inequality is not valid.

Step S710. Output a selection signal 0, and in this case, the MUX 35 outputs a gap data packet.

It can be learned from the foregoing descriptions that, in this embodiment of this application, a plurality of TMDS characters are output from the buffer 32 once, and after the plurality of TMDS characters are all output, a process of determining whether to output the TMDS character or output the gap data packet is executed again. Compared with the method that is provided in Embodiment 4 and in which the determining process is executed once each time one TMDS character is output, in this application, the determining process is executed once when a plurality of TMDS characters are output. Therefore, according to the method in this application, an execution quantity of the determining processes can be reduced obviously, so that power consumption is reduced.

Embodiment 6

Based on a same concept, this application further provides a data flow control apparatus. The apparatus may be specifically implemented by using hardware, software, or a combination of software and hardware. The apparatus may be a terminal such as a set-top box, a television, a computer, a smartphone, or another terminal.

FIG. 8 is a schematic structural diagram of a data flow control apparatus according to some embodiments of this application. As shown in FIG. 8, the data flow control apparatus 80 includes: a buffer unit 81, configured to store a transition-minimized differential signaling (TMDS) character; a calculation unit 82, configured to: when a clock signal arrives, calculate a quantity of TMDS characters currently stored in the buffer unit, where a cycle of the clock signal is set based on a TMDS character transmission rate on a fixed rate link (FRL); and an output unit 83, configured to: output the TMDS character in the buffer unit when the quantity of TMDS characters currently stored in the buffer unit reaches a preset value, or output a gap data packet when the quantity of TMDS characters currently stored in the buffer unit does not reach a preset value, where the preset value is less than or equal to a TMDS character storage capacity of the buffer unit.

In an implementation, the calculation unit 82 is specifically configured to: when the clock signal arrives, obtain a first total quantity of TMDS characters currently input to the buffer unit and a second total quantity of TMDS characters currently output from the buffer unit; and use a difference between the first total quantity and the second total quantity as the quantity of TMDS characters currently stored in the buffer unit. The output unit 83 is specifically configured to: when the quantity of TMDS characters currently stored in the buffer unit reaches the preset value, output one TMDS character stored in the buffer unit. Alternatively, the clock signal is a first clock signal, and the output unit 83 is specifically configured to: when the quantity of TMDS characters currently stored in the buffer unit reaches the preset value, output one TMDS character stored in the buffer unit; and when a second clock signal to an $I^{th}$ clock signal that are subsequent to the first clock signal, each arrive, output one TMDS character stored in the buffer unit, where I is greater than or equal to 2 and is less than or equal to M, M is the quantity of TMDS characters currently stored in the buffer unit, and both I and M are integers.

In an implementation, the calculation unit 82 is specifically configured to: when the clock signal arrives, obtain a third total quantity of TMDS characters input to the buffer unit and a fourth total quantity of TMDS characters input to the buffer unit, where the third total quantity is a total quantity of TMDS characters input to the buffer unit until the buffer unit outputs the last stored TMDS character previous time, and the fourth total quantity is a total quantity of TMDS characters input to the buffer unit at a current moment; and use a difference between the fourth total quantity and the third total quantity as the quantity of TMDS characters currently stored in the buffer unit. The clock signal is a first clock signal, the quantity of TMDS characters currently stored in the buffer unit is M, and M is an integer. The output unit 83 is specifically configured to: when M reaches the preset value, output one TMDS character stored in the buffer unit; and when a second clock signal to an $M^{th}$ clock signal that are subsequent to the first clock signal, each arrive, output one TMDS character stored in the buffer unit.

It should be noted that, because a problem-resolving principle of the apparatus provided in this embodiment of this application is similar to that of the method embodiment provided in the foregoing embodiments of the present invention, mutual reference may be made to specific implementation and beneficial effects of the apparatus provided in this embodiment of this application and implementation and beneficial effects of the method provided in the foregoing embodiments of the present invention. No repeated description is provided.

It should be further noted that, in this embodiment of this application, the unit division is an example, is merely logical function division, and may be other division in actual implementation. In addition, function units in each embodiment of this application may be integrated into one processor, or each of the units may exist alone physically, or two or more modules may be integrated into one module. The integrated module may be implemented in a form of hardware, or may be implemented in a form of a software function module.

Embodiment 7

Based on a same invention concept, as shown in FIG. 9, this application further provides a data flow control device 90, including a processor 901, a memory 902, and a communications interface 903. The processor 901, the memory 902, and the communications interface 903 are all connected by using a bus. The memory 902 is configured to store a computer execution instruction. The memory 902 may be a non-volatile memory such as a hard disk drive (HDD) or a solid-state drive (SSD), or may be a volatile memory such as a random access memory (RAM). The memory 902 is any other medium that can be used to carry or store desired program code in a form of an instruction or a data structure and that can be accessed by a computer, but is not limited thereto.

The processor 901 is configured to execute the computer execution instruction stored in the memory 902, to perform the data flow control method described in any one of the foregoing Embodiment 1 to Embodiment 5, and details are not described herein again in this application. The processor 901 may be a central processing unit (CPU), a digital processing module, or the like.

In this embodiment of this application, a specific connection medium among the communications interface 903, the processor 901, and the memory 902 is not limited. In this embodiment of this application, an example in which the memory 902, the processor 901, and the transceiver 903 may be connected to each other by using a bus in FIG. 9. The bus is represented by using a thick line in FIG. 9. A manner of connection between other components is merely an example for description, and imposes no limitation. The bus may be classified into an address bus, a data bus, a control bus, and the like. For ease of representation, only one thick line is used to represent the bus in FIG. 9, but this does not mean that there is only one bus or only one type of bus.

This application further provides a computer readable storage medium. The computer readable storage medium stores an instruction, and when the instruction runs on a computer, the computer performs the data flow control method according to the foregoing Embodiment 2, Embodiment 3, Embodiment 4, or Embodiment 5.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

These program instructions may be stored in a readable memory that can instruct the computer or another programmable data processing device to work in a specific manner, so that the instructions stored in the readable memory generate an artifact that includes an instruction apparatus. The instruction apparatus implements a specified function in one or more processes in the flowcharts and/or in one or more blocks in the block diagrams.

These program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to this application without departing from the scope of this application. This application is intended to cover these modifications and variations to this application provided that they fall within the scope of the claims of this application and their equivalent technologies.

What is claimed is:

1. A method, comprising:
    calculating, by a device when a clock signal arrives, a quantity of transition-minimized differential signaling (TMDS) characters currently stored in a buffer of the device; and
    in response to calculating the quantity of TMDS characters currently stored in the buffer:
        outputting, by the device, a TMDS character in the buffer when the quantity of TMDS characters currently stored in the buffer is at least a preset value, wherein the preset value is less than or equal to a TMDS character storage capacity of the buffer; and
        outputting a gap data packet when the quantity of TMDS characters currently stored in the buffer is less than the preset value.

2. The method according to claim 1, wherein calculating, by the device when the clock signal arrives, the quantity of TMDS characters currently stored in the buffer of the device comprises:
    when the clock signal arrives, obtaining, by the device, a first total quantity of TMDS characters currently input to the buffer and a second total quantity of TMDS characters currently output from the buffer; and
    using, by the device, a difference between the first total quantity and the second total quantity as the quantity of TMDS characters currently stored in the buffer.

3. The method according to claim 1, wherein outputting, by the device, the TMDS character in the buffer when the quantity of TMDS characters currently stored in the buffer is at least the preset value comprises:
    when the quantity of TMDS characters currently stored in the buffer is at least the preset value, outputting, by the device, only one TMDS character stored in the buffer.

4. The method according to claim 1, wherein:
    the clock signal is a first clock signal; and
    outputting, by the device, the TMDS character in the buffer when the quantity of TMDS characters currently stored in the buffer is at least the preset value comprises:
        when the quantity of TMDS characters currently stored in the buffer reaches the preset value, outputting, by the device, one TMDS character stored in the buffer; and
        when a second clock signal to an $I^{th}$ clock signal each arrive after the first clock signal, outputting, by the device, a respective TMDS character stored in the buffer, wherein I is greater than or equal to 2 and is less than or equal to M, wherein M is the quantity of TMDS characters currently stored in the buffer, and both I and M are integers.

5. The method according to claim 1, wherein calculating, by the device when the clock signal arrives, the quantity of TMDS characters currently stored in the buffer of the device comprises:
    when the clock signal arrives, obtaining, by the device, a third total quantity of TMDS characters input to the buffer and a fourth total quantity of TMDS characters input to the buffer, wherein the third total quantity is a total quantity of TMDS characters input to the buffer until a most recent output of a last stored TMDS character by the buffer, and the fourth total quantity is a total quantity of TMDS characters input to the buffer at a current moment; and
    using, by the device, a difference between the fourth total quantity and the third total quantity as the quantity of TMDS characters currently stored in the buffer.

6. The method according to claim 5, wherein:
    the clock signal is a first clock signal, the quantity of TMDS characters currently stored in the buffer is M, and M is an integer; and
    outputting, by the device, the TMDS character in the buffer when the quantity of TMDS characters currently stored in the buffer reaches the preset value comprises:
        when M is at least the preset value, outputting, by the device, one TMDS character stored in the buffer; and
        when a second clock signal to an $M^{th}$ clock signal each arrive after the first clock signal, outputting, by the device, a respective TMDS character stored in the buffer.

7. An apparatus, comprising:
a buffer configured to store a transition-minimized differential signaling (TMDS) character; and
at least one processor configured to:
when a clock signal arrives, calculate a quantity of TMDS characters currently stored in the buffer; and
in response to calculating the quantity of TMDS characters currently stored in the buffer:
output a TMDS character in the buffer when the quantity of TMDS characters currently stored in the buffer is at least a preset value, wherein the preset value is less than or equal to a TMDS character storage capacity of the buffer; and
output a gap data packet when the quantity of TMDS characters currently stored in the buffer is less than the preset value.

8. The apparatus according to claim 7, wherein the at least one processor is configured to:
when the clock signal arrives, obtain a first total quantity of TMDS characters currently input to the buffer and a second total quantity of TMDS characters currently output from the buffer; and
use a difference between the first total quantity and the second total quantity as the quantity of TMDS characters currently stored in the buffer.

9. The apparatus according to claim 7, wherein the at least one processor is configured to:
when the quantity of TMDS characters currently stored in the buffer is at least the preset value, output only one TMDS character stored in the buffer.

10. The apparatus according to claim 7, wherein:
the clock signal is a first clock signal; and
the at least one processor is configured to:
when the quantity of TMDS characters currently stored in the buffer is at least the preset value, output one TMDS character stored in the buffer; and
when a second clock signal to an $I^{th}$ clock signal each arrive after the first clock signal, output a respective TMDS character stored in the buffer, wherein I is greater than or equal to 2 and is less than or equal to M, M is the quantity of TMDS characters currently stored in the buffer, and both I and M are integers.

11. The apparatus according to claim 7, wherein the at least one processor is configured to:
when the clock signal arrives, obtain a third total quantity of TMDS characters input to the buffer and a fourth total quantity of TMDS characters input to the buffer, wherein the third total quantity is a total quantity of TMDS characters input to the buffer until a most recent output of a last stored TMDS character by the buffer, and the fourth total quantity is a total quantity of TMDS characters input to the buffer at a current moment; and
use a difference between the fourth total quantity and the third total quantity as the quantity of TMDS characters currently stored in the buffer.

12. The apparatus according to claim 11, wherein:
the clock signal is a first clock signal, the quantity of TMDS characters currently stored in the buffer is M, and M is an integer; and
the at least one processor is configured to:
when M is at least the preset value, output one TMDS character stored in the buffer; and
when a second clock signal to an $M^{th}$ clock signal each arrive after the first clock signal, output a respective TMDS character stored in the buffer.

13. A device, comprising:
a memory configured to store a computer execution instruction;
a communications interface; and
at least one processor connected to the memory and the communications interface by a bus, the at least one processor is configured to execute the computer execution instruction stored in the memory, to perform the following operations:
when a clock signal arrives, calculating a quantity of transition-minimized differential signaling (TMDS) characters currently stored in a buffer of the device; and
in response to calculating the quantity of TMDS characters currently stored in the buffer:
outputting a TMDS character in the buffer when the quantity of TMDS characters currently stored in the buffer is at least a preset value, the preset value is less than or equal to a TMDS character storage capacity of the buffer; and
outputting a gap cap data packet when the quantity of TMDS characters currently stored in the buffer is less than the preset value.

14. The device according to claim 13, wherein to output the TMDS character in the buffer when the quantity of TMDS characters currently stored in the buffer is at least the preset value, the processor is configured to:
when the quantity of TMDS characters currently stored in the buffer is at least the preset value, output only one TMDS character stored in the buffer.

15. The device according to claim 13, wherein:
the clock signal is a first clock signal; and
to output the TMDS character in the buffer when the quantity of TMDS characters currently stored in the buffer is at least the preset value, the processor is configured to:
when the quantity of TMDS characters currently stored in the buffer reaches the preset value, output one TMDS character stored in the buffer; and
when a second clock signal to an $I^{th}$ clock signal each arrive after the first clock signal, output a respective TMDS character stored in the buffer, wherein I is greater than or equal to 2 and is less than or equal to M, M is the quantity of TMDS characters currently stored in the buffer, and both I and M are integers.

16. A device, comprising:
a buffer configured to store a transition-minimized differential signaling (TMDS) character;
a TMDS character counter configured to:
record a quantity of TMDS characters input to or output from the buffer; and
send the quantity of TMDS characters recorded by the TMDS character counter to a controller;
the controller, wherein the controller is configured to:
when a clock signal arrives, calculate, according to the quantity of TMDS characters recorded by the TMDS character counter, a quantity of TMDS characters currently stored in the buffer;
in response to calculating the quantity of TMDS characters currently stored in the buffer:
send a first control signal to a multiplexer when the quantity of TMDS characters currently stored in the buffer is at least a preset value; and
send a second control signal to the multiplexer when the quantity of TMDS characters currently stored in the buffer is less than the preset value;

the multiplexer, wherein the multiplexer is configured to:
   in response to receiving the first control signal from the controller, output the TMDS character in the buffer; or
   in response to receiving the second control signal from the controller, output a gap data packet; and
a gap data packet generator configured to generate the gap data packet.

17. The device according to claim 16, wherein the TMDS character counter comprises an input TMDS character counter and an output TMDS character counter; and
   to calculate, when the clock signal arrives, the quantity of TMDS characters currently stored in the buffer, the controller is configured to:
      when the clock signal arrives, obtain, by the controller, a first count value currently recorded by the input TMDS character counter and a second count value recorded by the output TMDS character counter, wherein the first count value indicates a quantity of TMDS characters input to the buffer and currently recorded by the input TMDS character counter, and the second count value indicates a quantity of TMDS characters output from the buffer and currently recorded by the output TMDS character counter; and
      use a difference between the first count value and the second count value as the quantity of TMDS characters currently stored in the buffer.

18. The device according to claim 16, wherein to output the TMDS character in the buffer in response to receiving the first control signal from the controller, the multiplexer is configured to:
   output, by the multiplexer, only one TMDS character in the buffer in response to receiving the first control signal from the controller.

19. The device according to claim 16, wherein the clock signal is a first clock signal, and to send the first control signal to the multiplexer when the quantity of TMDS characters currently stored in the buffer is at least a preset value, the controller is configured to:
   send the first control signal to the multiplexer when the quantity of TMDS characters currently stored in the buffer is at least the preset value; and
   send the first control signal to the multiplexer when a second clock signal to an Ith clock signal each arrive after the first clock signal, wherein I is greater than or equal to 2 and is less than or equal to M, and M is the quantity of TMDS characters currently stored in the buffer, wherein both I and M are integers.

20. The device according to claim 16, wherein:
the TMDS character counter comprises an input TMDS character counter; and
to calculate, when the clock signal arrives, the quantity of TMDS characters currently stored in the buffer, the controller is configured to:
   when the clock signal arrives, obtain, by the controller, a third count value and a fourth count value recorded by the input TMDS character counter, wherein the third count value indicates a quantity that is of TMDS characters input to the buffer and that is recorded by the input TMDS character counter until a most recent output of a last stored TMDS character by the buffer, and the fourth count value indicates a quantity of TMDS characters input to the buffer and currently recorded by the input TMDS character counter; and
   use, by the controller, a difference between the fourth count value and the third count value as the quantity of TMDS characters currently stored in the buffer.

21. The device according to claim 20, wherein:
the clock signal is a first clock signal, the quantity of TMDS characters currently stored in the buffer is M, and M is an integer; and
to send the first control signal to the multiplexer when the quantity of TMDS characters currently stored in the buffer is at least the preset value, the controller is configured to:
   send the first control signal to the multiplexer when the quantity of TMDS characters currently stored in the buffer is at least the preset value; and
   send the first control signal to the multiplexer when a second clock signal to an $M^{th}$ clock signal each arrive, the second clock signal to the $M^{th}$ clock signal are after the first clock signal.

* * * * *